US008543423B2

(12) United States Patent
O'Malley et al.

(10) Patent No.: US 8,543,423 B2
(45) Date of Patent: Sep. 24, 2013

(54) METHOD AND APPARATUS FOR ENROLLING WITH MULTIPLE TRANSACTION ENVIRONMENTS

(75) Inventors: Anne O'Malley, Maplewood, NJ (US); Pragnesh Ray, Rancho Cucamonga, CA (US); Eve Reiter, New York, NY (US); Peter Saunders, Salt Lake City, UT (US); Stefan Teodosic, Evanston, IL (US); Dennis Tze, Ridgewood, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 2160 days.

(21) Appl. No.: 10/608,792

(22) Filed: Jun. 27, 2003

(65) Prior Publication Data
US 2004/0138989 A1    Jul. 15, 2004

Related U.S. Application Data

(60) Provisional application No. 60/396,577, filed on Jul. 16, 2002.

(51) Int. Cl.
*G06Q 10/00* (2012.01)

(52) U.S. Cl.
USPC .................................................. 705/4; 705/3

(58) Field of Classification Search
USPC ....................................................... 705/4, 16
See application file for complete search history.

(56) References Cited

U.S. PATENT DOCUMENTS 4,303,904 A    12/1981  Chasek
4,443,027 A    4/1984   McNeely et al.

(Continued)

FOREIGN PATENT DOCUMENTS

CH          689070        8/1998
EP        0 358 525 A2    3/1990

(Continued)

OTHER PUBLICATIONS

"What's New: Timex Watch Features Speedpass System", http://www.speedpass.com/news/article.jsp?id=51 (1 page).

(Continued)

*Primary Examiner* — Hiep V Nguyen
(74) *Attorney, Agent, or Firm* — Snell & Wilmer L.L.P.

(57) ABSTRACT

The present invention facilitates the enrollment of a user with multiple transaction environments, such as, for example, supplier membership programs. A browser uses integrated user information to facilitate the enrollment process between a user (e.g., a merchant or seller) and a supplier (e.g., a merchant or seller). An application for enrollment may include a user information pertinent for providing to the supplier for use in enrolling the user in a membership program that the user has an interest in. A user may submit data related to user information, products or services of interest to the user, and/or or the like to the browser to request for membership enrollment, or request a quote for the performance of services or payment for goods, or the user may be enrolled in a membership program automatically upon receipt of the user information. The data may be submitted manually or using a storage device containing the required enrollment information. The storage device may be a Radio Frequency Identification Device in contactless communication with browser. Upon submitting the data to browser, the user is automatically enrolled in the membership program, and the user membership identification information is then stored in the storage device for later retrieval and use. The merchant may then incent user's usage of the membership program.

25 Claims, 7 Drawing Sheets

(56) References Cited

U.S. PATENT DOCUMENTS

| | | |
|---|---|---|
| 4,450,535 A | 5/1984 | de Pommery et al. |
| 4,475,308 A | 10/1984 | Heise et al. |
| 4,583,766 A | 4/1986 | Wessel |
| 4,639,765 A | 1/1987 | dHont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,274,392 A | 12/1993 | dHont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | dHont et al. |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove et al. |
| 5,428,363 A | 6/1995 | dHont |
| 5,453,601 A | 9/1995 | Rosen |
| 5,453,747 A | 9/1995 | dHont |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,504,808 A | 4/1996 | Hamrick, Jr. |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,385 A | 6/1998 | Simon |
| 5,768,609 A | 6/1998 | Gove et al. |
| 5,770,843 A | 6/1998 | Rose |
| 5,774,882 A | 6/1998 | Keen et al. |
| 5,777,903 A | 7/1998 | Piosenka et al. |
| 5,778,067 A | 7/1998 | Jones et al. |

| Patent | | Date | Inventor | | Patent | | Date | Inventor |
|---|---|---|---|---|---|---|---|---|
| 5,778,069 | A | 7/1998 | Thomlinson et al. | | 5,953,710 | A | 9/1999 | Fleming |
| 5,785,680 | A | 7/1998 | Niezink et al. | | 5,955,717 | A | 9/1999 | Vanstone |
| 5,792,337 | A | 8/1998 | Padovani et al. | | 5,955,969 | A | 9/1999 | dHont |
| 5,793,324 | A | 8/1998 | Aslanidis et al. | | 5,956,024 | A | 9/1999 | Strickland et al. |
| 5,794,095 | A | 8/1998 | Thompson | | 5,956,699 | A | 9/1999 | Wong et al. |
| 5,797,060 | A | 8/1998 | Thompson | | 5,958,004 | A | 9/1999 | Helland et al. |
| 5,797,085 | A | 8/1998 | Beuk et al. | | 5,960,411 | A | 9/1999 | Hartman et al. |
| 5,797,133 | A | 8/1998 | Jones et al. | | 5,963,915 | A | 10/1999 | Kirsch |
| 5,798,709 | A | 8/1998 | Flaxl | | 5,963,924 | A | 10/1999 | Williams et al. |
| 5,809,142 | A | 9/1998 | Hurta et al. | | 5,966,697 | A | 10/1999 | Fergerson et al. |
| 5,809,288 | A | 9/1998 | Balmer | | 5,970,148 | A | 10/1999 | Meier |
| 5,809,633 | A | 9/1998 | Mundigl et al. | | 5,970,471 | A | 10/1999 | Hill |
| 5,825,007 | A | 10/1998 | Jesadanont | | 5,970,472 | A | 10/1999 | Allsop et al. |
| 5,825,302 | A | 10/1998 | Stafford | | 5,970,473 | A | 10/1999 | Gerszberg et al. |
| 5,826,077 | A | 10/1998 | Blakeley et al. | | 5,970,475 | E | 10/1999 | Barnes et al. |
| 5,826,241 | A | 10/1998 | Stein | | RE36,365 | E | 11/1999 | Levine et al. |
| 5,826,242 | A | 10/1998 | Montulli | | 5,978,840 | A | 11/1999 | Nguyen et al. |
| 5,826,243 | A | 10/1998 | Musmanno et al. | | 5,979,757 | A | 11/1999 | Tracy et al. |
| 5,828,044 | A | 10/1998 | Jun et al. | | 5,982,293 | A | 11/1999 | Everett et al. |
| 5,834,756 | A | 11/1998 | Gutman et al. | | 5,983,207 | A | 11/1999 | Turk et al. |
| 5,835,894 | A | 11/1998 | Adcock et al. | | 5,983,208 | A | 11/1999 | Haller |
| 5,841,364 | A | 11/1998 | Hagl et al. | | 5,987,140 | A | 11/1999 | Rowney et al. |
| 5,842,088 | A | 11/1998 | Thompson | | 5,987,155 | A | 11/1999 | Dunn et al. |
| 5,842,178 | A * | 11/1998 | Giovannoli ............... 705/26 | | 5,987,498 | A | 11/1999 | Athing et al. |
| 5,844,218 | A | 12/1998 | Kawan et al. | | 5,989,950 | A | 11/1999 | Wu |
| 5,844,230 | A | 12/1998 | Lalonde | | 5,991,413 | A | 11/1999 | Arditti et al. |
| 5,845,267 | A | 12/1998 | Ronen | | 5,991,608 | A | 11/1999 | Leyten |
| 5,851,149 | A | 12/1998 | Xidos et al. | | 5,991,748 | A | 11/1999 | Taskett |
| 5,852,812 | A | 12/1998 | Reeder | | 5,991,750 | A | 11/1999 | Watson |
| 5,854,891 | A | 12/1998 | Postlewaite et al. | | 5,996,076 | A | 11/1999 | Rowney et al. |
| 5,858,006 | A | 1/1999 | Van der AA et al. | | 5,999,914 | A | 12/1999 | Blinn et al. |
| 5,859,419 | A | 1/1999 | Wynn | | 6,000,832 | A | 12/1999 | Franklin et al. |
| 5,859,779 | A | 1/1999 | Giordano et al. | | 6,002,438 | A | 12/1999 | Hocevar et al. |
| 5,862,325 | A | 1/1999 | Reed et al. | | 6,002,767 | A | 12/1999 | Kramer |
| 5,864,306 | A | 1/1999 | Dwyer et al. | | 6,003,014 | A | 12/1999 | Lee et al. |
| 5,864,323 | A | 1/1999 | Berthon | | 6,005,942 | A | 12/1999 | Chan et al. |
| 5,864,830 | A | 1/1999 | Armetta et al. | | 6,006,216 | A | 12/1999 | Griffin et al. |
| 5,867,100 | A | 2/1999 | dHont | | 6,009,412 | A | 12/1999 | Storey |
| 5,870,031 | A | 2/1999 | Kaiser et al. | | 6,011,487 | A | 1/2000 | Plocher |
| 5,870,915 | A | 2/1999 | dHont | | 6,012,039 | A | 1/2000 | Hoffman et al. |
| 5,878,138 | A | 3/1999 | Yacobi | | 6,012,049 | A | 1/2000 | Kawan |
| 5,878,141 | A | 3/1999 | Daly et al. | | 6,012,143 | A | 1/2000 | Tanaka |
| 5,878,215 | A | 3/1999 | Kling et al. | | 6,012,636 | A | 1/2000 | Smith |
| 5,878,337 | A | 3/1999 | Joao et al. | | 6,014,634 | A | 1/2000 | Scroggie et al. |
| 5,878,403 | A | 3/1999 | DeFrancesco et al. | | 6,014,635 | A | 1/2000 | Harris et al. |
| 5,880,675 | A | 3/1999 | Trautner | | 6,014,636 | A | 1/2000 | Reeder |
| 5,881,272 | A | 3/1999 | Balmer | | 6,014,644 | A * | 1/2000 | Erickson ............... 705/37 |
| 5,884,280 | A | 3/1999 | Yoshioka et al. | | 6,014,645 | A | 1/2000 | Cunningham |
| 5,887,266 | A | 3/1999 | Heinonen et al. | | 6,014,646 | A | 1/2000 | Vallee et al. |
| 5,890,137 | A | 3/1999 | Koreeda | | 6,014,648 | A | 1/2000 | Brennan |
| 5,897,622 | A | 4/1999 | Blinn et al. | | 6,014,650 | A | 1/2000 | Zampese |
| 5,898,783 | A | 4/1999 | Rohrbach | | 6,014,748 | A | 1/2000 | Tushi et al. |
| 5,898,838 | A | 4/1999 | Wagner | | 6,016,482 | A | 1/2000 | Molinari et al. |
| 5,903,830 | A | 5/1999 | Joao et al. | | 6,016,484 | A | 1/2000 | Williams et al. |
| 5,903,875 | A | 5/1999 | Kohara | | 6,018,717 | A | 1/2000 | Lee et al. |
| 5,903,880 | A | 5/1999 | Biffar | | 6,018,718 | A | 1/2000 | Walker et al. |
| 5,905,798 | A | 5/1999 | Nerlikar et al. | | 6,021,943 | A | 2/2000 | Chastain |
| 5,905,908 | A | 5/1999 | Wagner | | 6,023,510 | A | 2/2000 | Epstein |
| 5,909,492 | A | 6/1999 | Payne et al. | | 6,024,286 | A | 2/2000 | Bradley et al. |
| 5,912,678 | A | 6/1999 | Saxena et al. | | 6,029,147 | A | 2/2000 | Horadan et al. |
| 5,913,203 | A | 6/1999 | Wong et al. | | 6,029,149 | A | 2/2000 | Dykstra et al. |
| 5,914,472 | A | 6/1999 | Foladare et al. | | 6,029,150 | A | 2/2000 | Kravitz |
| 5,915,023 | A | 6/1999 | Bernstein | | 6,029,890 | A | 2/2000 | Austin |
| 5,917,168 | A | 6/1999 | Nakamura et al. | | 6,029,892 | A | 2/2000 | Miyake |
| 5,918,216 | A | 6/1999 | Miksovsky et al. | | 6,032,136 | A | 2/2000 | Brake et al. |
| 5,920,628 | A | 7/1999 | Indeck et al. | | 6,038,292 | A | 3/2000 | Thomas |
| 5,923,734 | A | 7/1999 | Taskett | | 6,038,551 | A | 3/2000 | Barlow et al. |
| 5,929,801 | A | 7/1999 | Aslanidis et al. | | 6,038,584 | A | 3/2000 | Balmer |
| 5,930,767 | A | 7/1999 | Reber et al. | | 6,041,308 | A | 3/2000 | Walker et al. |
| 5,930,777 | A | 7/1999 | Barber | | 6,044,360 | A | 3/2000 | Picciallo |
| 5,931,917 | A | 8/1999 | Nguyen et al. | | 6,047,888 | A | 4/2000 | Dethloff |
| 5,933,624 | A | 8/1999 | Balmer | | 6,052,675 | A | 4/2000 | Checchio |
| 5,943,624 | A | 8/1999 | Fox et al. | | 6,058,418 | A | 5/2000 | Kobata |
| 5,945,653 | A * | 8/1999 | Walker et al. .......... 235/380 | | 6,061,344 | A | 5/2000 | Wood, Jr. |
| 5,948,116 | A | 9/1999 | Aslanidis et al. | | 6,061,789 | A | 5/2000 | Hauser et al. |
| 5,949,044 | A | 9/1999 | Walker et al. | | 6,064,320 | A | 5/2000 | dHont et al. |
| 5,949,335 | A * | 9/1999 | Maynard .............. 340/572.1 | | 6,064,981 | A | 5/2000 | Barni et al. |
| 5,949,876 | A | 9/1999 | Ginter et al. | | 6,070,003 | A | 5/2000 | Gove et al. |
| 5,953,512 | A | 9/1999 | Cai et al. | | 6,070,150 | A | 5/2000 | Remington et al. |

| | | | | | | |
|---|---|---|---|---|---|---|
| 6,070,154 | A | 5/2000 | Tavor et al. | 6,266,754 | B1 | 7/2001 | Laczko, Sr. et al. |
| 6,072,870 | A | 6/2000 | Nguyen et al. | 6,267,292 | B1 | 7/2001 | Walker et al. |
| 6,073,840 | A | 6/2000 | Marion | 6,269,348 | B1 | 7/2001 | Pare et al. |
| 6,076,078 | A | 6/2000 | Camp et al. | 6,273,335 | B1 | 8/2001 | Sloan |
| 6,078,888 | A | 6/2000 | Johnson, Jr. | 6,282,522 | B1 | 8/2001 | Davis et al. |
| 6,078,906 | A | 6/2000 | Huberman | D447,515 | S | 9/2001 | Faenza, Jr. et al. |
| 6,078,908 | A | 6/2000 | Schmitz | 6,286,763 | B1 | 9/2001 | Reynolds et al. |
| 6,081,790 | A | 6/2000 | Rosen | 6,289,324 | B1 | 9/2001 | Kawan |
| RE36,788 | E | 7/2000 | Mansvelt et al. | 6,293,462 | B1 | 9/2001 | Gangi |
| 6,088,683 | A | 7/2000 | Jalili | 6,315,193 | B1 | 11/2001 | Hogan |
| 6,088,686 | A | 7/2000 | Walker et al. | 6,315,195 | B1 | 11/2001 | Ramachandran |
| 6,088,717 | A | 7/2000 | Reed et al. | 6,317,721 | B1 | 11/2001 | Hurta et al. |
| 6,088,797 | A | 7/2000 | Rosen | 6,318,636 | B1 | 11/2001 | Reynolds et al. |
| 6,092,057 | A | 7/2000 | Zimmerman et al. | 6,323,566 | B1 | 11/2001 | Meier |
| 6,092,198 | A | 7/2000 | Lanzy et al. | 6,325,285 | B1 | 12/2001 | Baratelli |
| 6,098,053 | A | 8/2000 | Slater | 6,325,293 | B1 | 12/2001 | Moreno |
| 6,098,879 | A | 8/2000 | Terranova | 6,326,934 | B1 | 12/2001 | Kinzie |
| 6,101,174 | A | 8/2000 | Langston | 6,327,573 | B1 | 12/2001 | Walker et al. |
| 6,102,162 | A | 8/2000 | Teicher | 6,330,544 | B1 | 12/2001 | Walker et al. |
| 6,102,672 | A | 8/2000 | Woollenweber | 6,336,095 | B1 | 1/2002 | Rosen |
| 6,105,008 | A | 8/2000 | Davis et al. | 6,342,844 | B1 | 1/2002 | Rozin |
| 6,105,013 | A | 8/2000 | Curry et al. | 6,353,811 | B1 | 3/2002 | Weissman |
| 6,105,865 | A | 8/2000 | Hardesty | 6,364,208 | B1 | 4/2002 | Stanford et al. |
| 6,108,641 | A | 8/2000 | Kenna et al. | 6,367,011 | B1 | 4/2002 | Lee et al. |
| 6,109,525 | A | 8/2000 | Blomqvist et al. | 6,374,245 | B1 | 4/2002 | Park |
| 6,112,152 | A | 8/2000 | Tuttle | 6,377,034 | B1 | 4/2002 | Ivanov |
| 6,112,191 | A | 8/2000 | Burke | 6,378,073 | B1 | 4/2002 | Davis et al. |
| 6,115,360 | A | 9/2000 | Quay et al. | 6,388,533 | B2 | 5/2002 | Swoboda |
| 6,115,458 | A | 9/2000 | Taskett | 6,390,375 | B2 | 5/2002 | Kayanakis |
| 6,116,423 | A | 9/2000 | Troxtell, Jr. et al. | 6,400,272 | B1 | 6/2002 | Holtzman et al. |
| 6,116,505 | A | 9/2000 | Withrow | 6,402,026 | B1 | 6/2002 | Schwier |
| 6,118,189 | A | 9/2000 | Flaxl | 6,402,028 | B1 | 6/2002 | Graham, Jr. et al. |
| 6,121,544 | A | 9/2000 | Petsinger | 6,411,611 | B1 | 6/2002 | Van der Tuijn |
| 6,122,625 | A | 9/2000 | Rosen | 6,415,978 | B1 | 7/2002 | McAllister |
| 6,123,223 | A | 9/2000 | Watkins | 6,422,464 | B1 | 7/2002 | Terranova |
| 6,125,352 | A | 9/2000 | Franklin et al. | 6,424,029 | B1 | 7/2002 | Giesler |
| 6,129,274 | A | 10/2000 | Suzuki | RE37,822 | E | 8/2002 | Anthonyson |
| 6,133,834 | A | 10/2000 | Eberth et al. | 6,427,910 | B1 | 8/2002 | Barnes et al. |
| 6,141,651 | A | 10/2000 | Riley et al. | 6,438,235 | B2 | 8/2002 | Sims, III |
| 6,141,752 | A | 10/2000 | Dancs et al. | 6,439,455 | B1 | 8/2002 | Everett et al. |
| 6,163,771 | A | 12/2000 | Walker et al. | 6,442,532 | B1 | 8/2002 | Kawan |
| 6,167,236 | A | 12/2000 | Kaiser et al. | 6,445,794 | B1 | 9/2002 | Shefi |
| 6,173,269 | B1 | 1/2001 | Sokol et al. | 6,457,996 | B1 | 10/2002 | Shih |
| 6,173,272 | B1 | 1/2001 | Thomas et al. | 6,466,804 | B1 | 10/2002 | Pecen et al. |
| 6,177,860 | B1 | 1/2001 | Cromer et al. | 6,473,500 | B1 | 10/2002 | Risafi et al. |
| 6,179,205 | B1 | 1/2001 | Sloan | 6,480,100 | B1 | 11/2002 | Frieden et al. |
| 6,179,206 | B1 | 1/2001 | Matsumori | 6,480,101 | B1 | 11/2002 | Kelly et al. |
| 6,188,994 | B1 | 2/2001 | Egendorf | 6,481,621 | B1 | 11/2002 | Herrendoerfer et al. |
| 6,189,787 | B1 | 2/2001 | Dorf | 6,481,632 | B2 | 11/2002 | Wentker et al. |
| 6,192,255 | B1 | 2/2001 | Lewis et al. | 6,483,427 | B1 | 11/2002 | Werb |
| 6,198,728 | B1 | 3/2001 | Hulyalkar et al. | 6,483,477 | B1 | 11/2002 | Plonka |
| 6,198,875 | B1 | 3/2001 | Edenson et al. | 6,483,929 | B1 | 11/2002 | Murakami et al. |
| 6,202,927 | B1 | 3/2001 | Bashan et al. | 6,484,937 | B1 | 11/2002 | Devaux et al. |
| 6,205,151 | B1 | 3/2001 | Quay et al. | 6,490,443 | B1 | 12/2002 | Freeny, Jr. |
| 6,206,293 | B1 | 3/2001 | Gutman et al. | 6,491,229 | B1 | 12/2002 | Berney |
| 6,213,390 | B1 | 4/2001 | Oneda | 6,494,380 | B2 | 12/2002 | Jarosz |
| 6,215,437 | B1 | 4/2001 | Schurmann et al. | 6,507,762 | B1 | 1/2003 | Amro et al. |
| 6,216,219 | B1 | 4/2001 | Cai et al. | 6,510,983 | B2 | 1/2003 | Horowitz et al. |
| 6,219,439 | B1 | 4/2001 | Burger | 6,510,998 | B1 | 1/2003 | Stanford et al. |
| 6,220,510 | B1 | 4/2001 | Everett et al. | 6,513,015 | B2 | 1/2003 | Ogasawara |
| 6,222,914 | B1 | 4/2001 | McMullin | 6,519,565 | B1 | 2/2003 | Clements et al. |
| D442,627 | S | 5/2001 | Webb et al. | 6,520,542 | B2 | 2/2003 | Thompson et al. |
| D442,629 | S | 5/2001 | Webb et al. | 6,529,880 | B1 | 3/2003 | McKeen et al. |
| 6,223,984 | B1 | 5/2001 | Renner et al. | 6,535,726 | B1 | 3/2003 | Johnson |
| 6,226,382 | B1 | 5/2001 | MRaihi et al. | 6,546,373 | B1 | 4/2003 | Cerra |
| 6,227,447 | B1 | 5/2001 | Campisano | 6,547,133 | B1 | 4/2003 | DeVries, Jr. et al. |
| 6,230,270 | B1 | 5/2001 | Laczko, Sr. | 6,549,912 | B1 | 4/2003 | Chen |
| 6,232,917 | B1 | 5/2001 | Baumer et al. | 6,560,581 | B1 | 5/2003 | Fox et al. |
| 6,233,683 | B1 | 5/2001 | Chan et al. | 6,577,229 | B1 | 6/2003 | Bonneau et al. |
| 6,237,848 | B1 | 5/2001 | Everett | 6,578,768 | B1 | 6/2003 | Binder et al. |
| 6,239,675 | B1 | 5/2001 | Flaxl | 6,581,839 | B1 | 6/2003 | Lasch et al. |
| 6,240,187 | B1 | 5/2001 | Lewis | 6,587,835 | B1 | 7/2003 | Treyz et al. |
| 6,248,199 | B1 | 6/2001 | Smulson | 6,588,660 | B1 | 7/2003 | Buescher et al. |
| 6,257,486 | B1 | 7/2001 | Teicher et al. | 6,589,119 | B1 | 7/2003 | Orus et al. |
| 6,259,769 | B1 | 7/2001 | Page | 6,598,024 | B1 | 7/2003 | Walker et al. |
| 6,260,026 | B1 | 7/2001 | Tomida et al. | 6,608,995 | B1 | 8/2003 | Kawasaki et al. |
| 6,260,088 | B1 | 7/2001 | Gove et al. | 6,609,655 | B1 | 8/2003 | Harrell |
| 6,263,316 | B1 | 7/2001 | Khan et al. | 6,623,039 | B2 | 9/2003 | Thompson et al. |
| 6,264,106 | B1 | 7/2001 | Bridgelall | 6,626,356 | B2 | 9/2003 | Davenport et al. |

| Patent No. | Date | Inventor |
|---|---|---|
| 6,628,961 B1 | 9/2003 | Ho et al. |
| 6,636,833 B1 | 10/2003 | Flitcroft et al. |
| 6,650,887 B2 | 11/2003 | McGregor et al. |
| 6,662,166 B2 | 12/2003 | Pare et al. |
| 6,665,405 B1 | 12/2003 | Lenstra |
| 6,669,086 B2 | 12/2003 | Abdi et al. |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,705,530 B2 | 3/2004 | Kiekhaefer |
| 6,711,262 B1 | 3/2004 | Watanen |
| 6,732,936 B1 | 5/2004 | Kiekhaefer |
| 6,742,120 B1 | 5/2004 | Markakis et al. |
| 6,747,546 B1 | 6/2004 | Hikita et al. |
| 6,760,581 B2 | 7/2004 | Dutta |
| 6,769,718 B1 | 8/2004 | Warther et al. |
| 6,771,981 B1 * | 8/2004 | Zalewski et al. .............. 455/557 |
| 6,789,012 B1 | 9/2004 | Childs et al. |
| 6,834,270 B1 | 12/2004 | Pagani et al. |
| 6,843,415 B2 * | 1/2005 | Vogler ........................ 235/385 |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,895,310 B1 | 5/2005 | Kolls |
| 6,994,262 B1 | 2/2006 | Warther |
| 6,996,538 B2 * | 2/2006 | Lucas ............................ 705/28 |
| 7,003,501 B2 | 2/2006 | Ostroff |
| 7,069,444 B2 | 6/2006 | Lowensohn et al. |
| 7,096,204 B1 | 8/2006 | Chen et al. |
| 7,100,821 B2 | 9/2006 | Rasti |
| 7,103,575 B1 | 9/2006 | Linehan |
| 7,119,659 B2 * | 10/2006 | Bonalle et al. ............... 340/5.61 |
| 7,136,835 B1 | 11/2006 | Flitcroft et al. |
| 7,213,748 B2 | 5/2007 | Tsuei et al. |
| 7,590,637 B2 * | 9/2009 | Braun-Huon ........................ 1/1 |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0034720 A1 | 10/2001 | Armes |
| 2001/0039617 A1 | 11/2001 | Buhrlen et al. |
| 2001/0049628 A1 | 12/2001 | Icho |
| 2002/0011519 A1 | 1/2002 | Shults |
| 2002/0026419 A1 | 2/2002 | Maritzen et al. |
| 2002/0028704 A1 | 3/2002 | Bloomfield et al. |
| 2002/0035548 A1 | 3/2002 | Hogan et al. |
| 2002/0042782 A1 * | 4/2002 | Albazz et al. .................. 705/80 |
| 2002/0046341 A1 | 4/2002 | Kazaks et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0154795 A1 | 10/2002 | Lee et al. |
| 2002/0166891 A1 | 11/2002 | Stoutenburg et al. |
| 2002/0174067 A1 | 11/2002 | Hoffman et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018567 A1 | 1/2003 | Flitcroft et al. |
| 2003/0025600 A1 | 2/2003 | Blanchard |
| 2003/0028481 A1 | 2/2003 | Flitcroft et al. |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0130820 A1 | 7/2003 | Lane, III |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0006539 A1 | 1/2004 | Royer et al. |
| 2004/0010462 A1 | 1/2004 | Moon et al. |
| 2004/0015451 A1 | 1/2004 | Sahota et al. |
| 2004/0016796 A1 | 1/2004 | Hann et al. |
| 2004/0019494 A1 * | 1/2004 | Ridgeway et al. ................ 705/1 |
| 2004/0020982 A1 | 2/2004 | Hoffman et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0083184 A1 | 4/2004 | Tsuei et al. |
| 2004/0139021 A1 | 7/2004 | Reed et al. |
| 2005/0017068 A1 | 1/2005 | Zalewski et al. |
| 2005/0038718 A1 | 2/2005 | Barnes et al. |
| 2005/0040272 A1 | 2/2005 | Argumedo et al. |
| 2005/0060233 A1 * | 3/2005 | Bonalle et al. ................. 705/16 |
| 2005/0064868 A1 * | 3/2005 | Coppinger et al. ........ 455/435.1 |
| 2005/0119978 A1 | 6/2005 | Ates |
| 2005/0121512 A1 | 6/2005 | Wankmueller |

FOREIGN PATENT DOCUMENTS

| | | |
|---|---|---|
| EP | 0 424 726 A1 | 10/1990 |
| EP | 0 484 726 A1 | 5/1992 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 A2 | 4/2002 |
| EP | 1 251 450 A1 | 10/2002 |
| GB | 2347537 | 9/2000 |
| GB | 2 361 790 A | 10/2001 |
| JP | 2000-1109 A | 1/2000 |
| JP | 2000-015288 A | 1/2000 |
| JP | 2000011109 A | 1/2000 |
| JP | 2000-40181 A | 2/2000 |
| JP | 2000-67312 A | 3/2000 |
| JP | 2000-207641 A | 7/2000 |
| JP | 2001-5931 A | 1/2001 |
| JP | 2001-283122 A | 10/2001 |
| WO | WO 95-32919 | 12/1995 |
| WO | 97/09688 A3 | 3/1997 |
| WO | WO 99/03057 A1 | 1/1999 |
| WO | 99/49424 A1 | 9/1999 |
| WO | WO 00/10144 A1 | 2/2000 |
| WO | WO 00/38088 A1 | 6/2000 |
| WO | 00/49586 A1 | 8/2000 |
| WO | WO 01/04825 A1 | 1/2001 |
| WO | WO 01/15098 A1 | 3/2001 |
| WO | WO 01/43095 A2 | 6/2001 |
| WO | WO 01/72224 A1 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |
| WO | 03/007623 A3 | 1/2003 |

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).
"'Magic Wands' to Speed Mobile Sales", BobBrewin, Jan. 15, 2001, http://www.computerworld.com/mobiletopics/mobile/story/1,10801,563300.html (4 pages).
"Mobile Speedpass Goes Global as Mobil Singapore Rolls Out Asia's First RFID-Based Pay-at-the-Pump System", Press Release, Apr. 5, 1999, http://www.ti.com/tiris/docs/news_releases/rel12.htm (3 pages).
"Speedpass Unleashed", Jun. 4, 2002 http://www.cardweb.com/cardtrak/news/cf2_20a_97.html (2 pages).
Prophecy Central Update #9, Oct. 10, 1997, http://www.bible-prophecy.com/pcu9.htm (5 pages).
International Newsletter of the TI RFID Group, Issue 20, 2000 (12 pages).
"CES: Microsoft's Spot Technology has Humble Origins", by James Niccolai, Jan. 10, 2003, http://archive.inforworld.com/articles/hn/xml/03/01/10/030110hnspot.xml?s=IDGNS (3 pages).
"Microsoft: See SPOT Run on Your Wrist", by Richard Shim, Jun. 5, 2003, http://news.com.com/2100-1041_3-1013442.html?tag=fd_top (1 page).
"Networking: Microsoft SPOT", by Jeremy A. Kaplan, Jul. 1, 2003, http://www.pcmag.com/print_article/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its Quick Wave RFID payment card for another three months", RFID Journal, Jan. 23, 2003.
"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU, a startup that offers security software, has relased of Java version of its NTRU encryption algorithm", RFID Journal, Jun. 27, 2002.
"Making RFID Payments Ubiquitous: Philips and Visa want people to be able to pay for goods and services anywhere by using RFID chips embedded in the phones and other devices", RFID Journal, Jun. 2, 2003.
"RFID Smart Cards Gain Ground: The convenience of contactless transactions is driving widespread adoption of contactless smart cards", RFID Journal, Apr. 9, 2003.
"TI Embarces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MFI IC S50, Philips Semiconductors, Product Specification Rev. 5.1 May 2001.
American Express, Private Payments SM: A New Level of Security from American Express, American Express Website, Cards.
Bonsor, "How Facial Recognition Systems Work", http://computer.howstuffworks.com/facial-recognition.htm/printable, Feb. 18, 2004, 6 pages.
Bowman, "Everything You Need to Know About Biometrics", Identix Corporation, Jan. 2008, 8 pages.
Carey, Gordon, "Multi-tier Copay", Pharmaceutical Executive, Feb. 2000.
Crumbaugh, Darlene M., "Effective Marketing Positions: Check card as consumer lifeline", Hoosier Banker, Apr. 1998, p. 10, vol. 82, Issue 4.
Disposable Credit Card Numbers, courtesy of CardRatings.org, The Dollar Stretcher, www.stretcher.com/stories/01/010212e.cfm, Jan. 2001.
Docmemory, RFID Takes Priority With Wal-Mart, http://www.simmtester.com/page/news/shownews.asp?num=6650, Feb. 9, 2004, 2 pages.
Evers, "Judge Dismisses FTC Suit Against Rambus", IDG New Service, http://www.infoworld.com/article/04/02/18/HNjudgedismisses_1.html, Feb. 18, 2004, 3 pages.
Gabber, et al., "Agora: A Minimal Distributed Protocol for Electronic Commerce", USENIX Oakland, CA, Nov. 18, 1996.
Goldwasser, Joan, "Best of the Cash-back Cards", Kiplinger's Personal Finance Magazine, Apr. 1999.
Greene, Thomas C., American Express offers temporary CC numbers for the Web, The Register, www.theregister.co.uk/content/1/13132.html, Sep. 9, 2000.
Harris, "How Fingerprint Scanners Work", http://computer.howstuffworks.com/fingerprint-scanner.htm/printable, Feb. 18, 2004, 6 pages.

http://www.palowireless.com/infotooth/tutorial.asp, Apr. 28, 2003.
http://www.palowireless.com/infotooth/tutorial/l2cap.asp, Apr. 28, 2003.
http://www.palowireless.com/infotooth/tutorial/baseband.asp, Apr. 28, 2003.
http://www.palowireless.com/infotooth/tutorial/hci.asp, Apr. 28, 2003.
http://www.palowireless.com/infotooth/tutorial/lmp.asp, Apr. 28, 2003.
http://www.palowireless.com/infotooth/tutorial/k1_gap.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/whatis.asp, Apr. 28, 2003.
http://www.semiconductors.philips.com/news/content/file_878.html, Apr. 7, 2003.
Hurley et al., "Automatic Ear Recognition by Force Field Transformations", The Institution of Electrical Engineers, 2000, pp. 7/1-7/5.
International Search Report and Written Opinion of the International Searching Authority, PCT/US05/26067, May 23, 2007.
"Credit Card Offer Travelers New Benefit", PR Newswire, Aug. 5, 1987.
"Fingerprint Analysis—The Basics", http://www.crimtrac.gov.au/fingerprintanalysis.htm, Feb. 18, 2004, 3 pages.
"Fingerprint Technology—Identix Inc.—Empowering Identification™ —Understanding Biometrics", http://www.identix.com/newsroom/news_biometrics_finger.html, Feb. 18, 2004, 1 page.
"Identix Inc.—Empowering Identification™ —Understanding Biometrics", http://www.identix.com/newsroom/news_biometrics_face.html, 1 page.
"Individual Biometric—Facial Recognition", http://ctl.ncsc.dni.us/biomet%20web/Bmfacial.html, Feb. 18, 2004, 2 pages.
"Individual Biometric—Fingerprint", http://ctl.ncsc.dni.us/biomet%20web/BMFingerprint.html, Feb. 18, 2004, 3 pages.
"Individual Biometric—Hand Geometry", http://ctl.ncsc.dni.us/biomet%20web/BMHand.html, Feb. 18, 2004, 2 pages.
"Individual Biometric—Iris Scan", http://ctl.ncsc.dni.us/biomet%20web/BMIris.html, Feb. 18, 2004, 2 pages.
"Individual Biometric—Retinal Scan", http://ctl.ncsc.dni.us/biomet%20web/BMRetinal.html, Feb. 18, 2004, 2 pages.
"Individual Biometric—Vascular Patterns", http://ctl.ncsc.dni.us/biomet%20web/BMVascular.html, Feb. 18, 2004, 1 page.
"International Biometric Group—Signature Biometrics: How it Works", http://www.ibgweb.com/reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"ISO Magnetic Strip Card Standards", http://www.cyberd.co.uk/support/technotes/isocards.htm, Feb. 9, 2004, 4 pages.
"New Evidence about Positive Three-Tier Co-pay Performance Presented at Express Scripts 2000 Outcomes Conference", PR Newswire Association, Inc., Jun. 28, 2000.
"Pay by Touch—Press Releases", http://www.paybytouch.com/press/html, Feb. 10, 2004, 3 pages.
"Paying It by Ear", The Guardian http://money.guardian.co.uk/creditanddebt/creditcards/story/0,1456,876908,00.html, Jan. 18, 2003, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.
"Prestige Credit Cards: Those Pricey Plastics", Changing Times, Apr. 1986.

"Shell Introduces Optional Credit Card", The Associated Press, Sep. 3, 1985.
"Shell Introducing Expanded 'Signature' Credit Card", Tulsa Business Chronicle, Sep. 5, 1985.
"Shell-Oil: Introduces Shell Signature Travel and Entertainment Credit Card", Business Wire, Sep. 3, 1985.
"Smart Card Developer's Kit: Some Basic Standards for Smart Card", http://unix.be.eu.org/docs/smart-card-developer-kit/ch03/033-035.html, Feb. 9, 2004, 2 pages.
"The Chase Manhattan Bank Today Announced a Comprehensive Program to Enhance the Value of All its Credit Cards", PR Newswire, Dec. 18, 1986.
"The Henry Classification System", International Biometric Group, 7 pages.
American Express to offer disposable credit card numbers, CNN.com. U.S. News, www.cnn.com/2000/US/09/08/online.payments.ap/, Sep. 8, 2000.
International Search Report and Written Opinion of the International Searching Authority, PCT/U505/26101, May 13, 2008.
Korotkaya, "Biometric Person Authentication: Odor", Department of Information Technology, Laboratory of Applied Mathematics, Lappeenranta University of Technology, 18 pages.
Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.
Kulkarni, et al., "Biometrics: Speaker Verification" http://biometrics.cse.msu.edu/speaker.html, Mar. 8, 2004, 5 pages.
Kuntz, Mary, "Credit Cards as Good as Gold", Forbes, Nov. 4, 1985.
Lahey, Liam, "Microsoft Bolsters Rebate Structure", Computer Dealer News, Feb. 8, 2002.
Lamond, "Credit Card Transactions Real World and Online" © 1996.
Luettin, "Visual Speech and Speaker Recognition", http://herens.idiap.ch/~luettin/luettin-thesis.bib.abs.html, Jun. 30, 2000, 1 page.
Martin, Zack, One-Time Numbers Stop Web Hackers From Pilfering Data, Card Marketing, Thomson Financial, www.cardforum.com/html/cardmark/jan01_c3.htm, Jan. 2001.
McPerson, "The Evolution of Mobile Payment", Financial Insights, http://www.banktech.com/story/news/showArticle.jhtml?articleID=17601432, Feb. 2, 2004, 2 pages.
Nyman, Judy, "Free Income Tax Clinics are Opening as Apr. 30 Deadline Draws Nearer", The Toronto Star, Final Edition, Mar. 25, 1986.
Obel, Michael, "Oil Companies Push Marketing, Cost Cutting to Fortify Earnings", Oil & Gas Journal, Sep. 16, 1985.
Pay by Touch—Company, http://www.paybytouch.com/company.html.
Roberti, "TI Embraces Prox Card Standard", http://www.ti.com/tiris/docs/news/in_the_news/2003/3-6-03.shtml, Mar. 6, 2003, 2 pages.
Rohde, "Microsoft, IBM and Phillips Test RFID Technology", IDG New Service, http://www.computerweekly.com/Article127889.htm, Feb. 9, 2004, 3 pages.
Ross et al., "Biometrics: Hand Geometry", http://biometrics.cse.msu.msu.edu/hand_geometry.html, Feb. 26, 2004, 2 pages.
Schmuckler, Eric, "Playing Your Cards Right", Forbes, Dec. 28, 1987.
Sony, Philips to Test RFID Platform, RFID Journal, May 8, 2003, 2 pages.
Wilson, "Putting Their Finger on It", http://sanfrancisco.bizjournals.com/sanfrancisco/stories/2003/10/20/story6.html?t=printable, Feb. 9, 2004, 2 pages.
"Core One Credit Union—Discover the Advantage", http://coreone.org/2visa.html, Copyright 2001, (Last Visited Oct. 9, 2002).

* cited by examiner

METHOD AND APPARATUS FOR ENROLLING WITH MULTIPLE TRANSACTION ENVIRONMENTS

RELATED APPLICATIONS

This invention claims priority to U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, entitled "SYSTEM AND METHOD FOR RFID PAYMENTS," filed Jul. 10, 2001), to U.S. Provisional Patent Application No. 60/396,577, entitled "SYSTEM AND METHOD FOR PAYMENT USING RADIO FREQUENCY IDENTIFICATION IN CONTACT AND CONTACTLESS TRANSACTIONS" filed on Jul. 16, 2002, and to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, all of which are incorporated herein by reference.

FIELD OF INVENTION

The present invention generally relates to the enrollment of a user in a system for managing multiple user accounts, and more particularly, to a system and method for enrolling a user into multiple accounts using a single storage ready device.

BACKGROUND OF THE INVENTION

Many merchants require an exchange of customer information for services. Where one customer seeks a quote from an insurance provider, for example, the insurance provider may use the consumer information to calculate a quote for an insurance premium. In this context, service providers which may respond to a request for a quote from the customer, may be termed a "request for quote" (RFQ) provider.

Request for quote (RFQ) providers may provide one or more quotes to users in connection with various areas of business and commerce, wherein the users may transact or otherwise communicate in a business to business environment, a business to customer environment, and/or a customer to customer environment depending on the context of the transaction. A user is typically a customer (e.g., desiring to purchase and/or sell a product, service or other item of commerce). A user may also be a merchant, a distributor, a supplier, a seller, and/or the like. An RFQ is a user's request for a bid a quote for goods or services (e.g., price bid) and/or other information, wherein the user may want to purchase, sell, lease, rent, use or exploit in any way a product or service (see generally, e.g., American Express®. RFQ Services at www.americanexpress.com). An RFQ provider is typically a person, entity, or organization, which provides quotes for a product or services or requests quotes for a product or service from one or more suppliers. A supplier may be a merchant, a distributor, a manufacturer, a seller, and/or the like. In one example, a user enrolled with an RFQ provider typically receives a quote from a supplier via the RFQ provider in connection with a product or service. The user responds to the quote by accepting, rejecting, or ignoring the quote.

However, a problem with the RFQ process is that registration in multiple RFQ processes is typically time consuming and inefficient. For example, where a user desires multiple quotes from different RFQ providers, the user must enroll with each individual provider. This, of course, means that the user typically completes different enrollment applications for each RFQ provider. Thus, a method and apparatus for facilitating the enrollment of a user with multiple RFQ providers is desired.

Further, where the user enrolls with different RFQ providers, each individual RFQ provider may provide the user with a unique RFQ provider associated identifier for identifying a particular user. The unique identifier is usually provided to the user in a presentable form factor, such as, for example, a membership card, a key ring tag, including a bar code, or magnetic stripe readable user identifier, or the like. The user may be permitted to present the unique identifier to the corresponding RFQ provider to receive a quote for goods and services, and/or to purchase a desired product. The RFQ provider may recognize the unique identifier as corresponding to a particular user, authenticate the user identity and/or provide incentives or rewards to the user based on any predetermined criteria.

A problem exists, however, in that the user must often remember the location of each presentable form factor for presenting the unique identifier to each respective RFQ provider. That is, tracking numerous identifiers may be burdensome for the user. Thus, a method for managing multiple user identifiers is desired.

SUMMARY OF THE INVENTION

The present invention facilitates the enrollment of a user with multiple request for quote (RFQ) providers. To register, a user may submit to a Request for Quote Enrollment (RFQE) system data related to user information (e.g., user purchase preferences, demographics, etc.), the type of RFQ that the user desires to receive, and/or the like. In one exemplary embodiment, the user may submit the required information to a RFQE system manually by completing and submitting an enrollment, membership or application form. Alternatively, the RFQE data may be stored on a presentable form factor, such as, for example, a readable storage device. Exemplary readable storage devices may include, any device capable of being handheld and which may store one or more unique user associated identifiers. For example, the readable storage device may be a smartcard, such as, for example, the smartcard disclosed in U.S. application Ser. No. 09/653,837, filed Sep. 1, 2000 and entitled "Transaction Card," incorporated herein in its entirety. In another exemplary embodiment, the readable storage device may be a radio frequency identifier (RFID) device, such as, for example, the RFID fob, disclosed in U.S. application Ser. No. 10/192,488, filed Jul. 9, 2002, entitled "System and Method for Payment Using Radio Frequency Identification in Contact and Contactless Transaction," and its progeny, all of which are incorporated by reference. The readable storage device may include multiple storage locations for storing multiple unique identifiers provided by an RFQ provider and for storing the RFQE data for later presentation. To facilitate understanding of the invention, the term fob is used herein to represent any suitable readable storage device which may be operable with this invention. Additionally, the readable storage device may use contact or contactless methods of data transfer.

In another aspect of the invention, the RFQ provider may provide a unique identifier to the user (e.g., enrollment identifier, membership identifier, etc.). The unique identifier may be provided to the storage device, for storage in a readable database. The storage device may be configured to present the identifier to a requesting RFQ provider (e.g., the unique identifier providing RFQ provider) upon interrogation or request.

Upon request, the RFQ provider may receive the unique identifier data via an RFQE system, and may provide reward or incentive points to the corresponding storage device based on any RFQ provider determined criteria. The incentive points may be stored in a storage device database, which the user may later redeem for products or services. Alternatively, the RFQ provider may store the incentive points on a remote provider managed, controlled or initiated database, wherein the incentive points may be stored in a data location correlated to the unique identifier. The rewarding of incentive or rewards points for RFID fob usage may be done upon presentment and interrogation of the fob by the RFQE system, for example, by correlating the unique identifier to the storage device, and/or to an offer for enrollment provided by the RFQ provider. One exemplary method suitable for use with the present invention is disclosed in U.S. application Ser. No. 10/340,352, filed Jan. 10, 2003, entitled "System and Method for Incenting Payment Using Radio Frequency Identification In Contact and Contactless Transactions," incorporated herein by reference, in its entirety.

The RFQE system uses an integrated system of data transfer to enroll the user with multiple RFQ providers. For example, the RFQE system communicates with a plurality of RFQ providers via a communication channel in order to transfer user RFQE data, receive information from the RFQ providers, and otherwise facilitate communications between the user and the RFQ providers. In one exemplary embodiment, where the storage device includes the RFQE data, the data may be provided from (e.g., read or retrieved from) the storage device to the RFQ provider for use in enrolling the user in a RFQ provider managed service. Upon enrollment, the RFQ provider may provide a unique user identifier to the storage device for use in later authentication or recognition of the user. Since the storage device includes unique storage areas relative to multiple unique user identifiers, the user may present the RFQE data to multiple RFQ providers for enrollment in similar manner as described above receive a unique identifier from each individual RFQ provider and store each unique identifier into the correlative unique storage areas on the storage device.

In an alternative exemplary embodiment, the RFQE system may include a universal service system for use in enrolling a user in multiple RFQ provider services. In this instance the user may provide the RFQE data (i.e., user enrollment data) to the universal service system. The universal service system may then provide the RFQE data to a plurality of RFQ providers for enrollment in service programs (e.g., membership, incentive, etc.) managed by the individual providers. In this manner, the present invention relieves the user from having to enroll with each RFQ provider individually (e.g., visit many RFQ provider web sites and enroll multiple times). Thus, the RFQE system expands the distribution opportunities for the user and saves the user time by enrolling the user with multiple RFQ providers.

BRIEF DESCRIPTION OF THE DRAWINGS

The subject invention will hereinafter be described in the context of the appended drawing figures, wherein like numerals denote like elements, and.

DETAILED DESCRIPTION OF EXEMPLARY EMBODIMENTS

Figure 1:
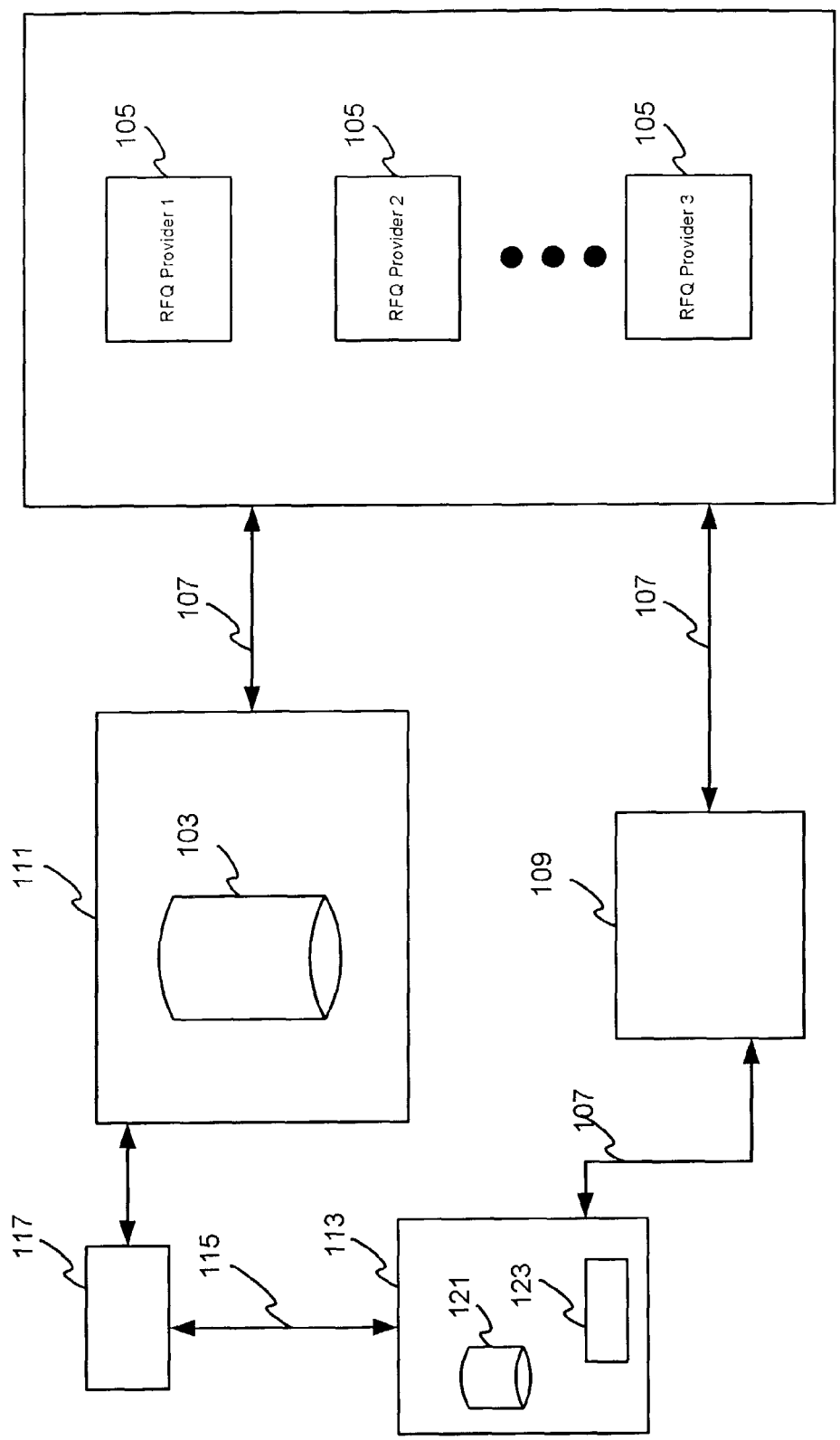
FIG. 1 illustrates a system for enrolling a user with multiple transaction environments in accordance with an exemplary embodiment of the present invention.

The present invention may be described herein in terms of functional block components, screen, shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as Basic, C, C++, Java, COBOL, assembler, PERL, eXtensible Markup Language (XML), JavaCard, MULTOS, or any such chip language protocol, with the various algorithms being implemented with any combination of data structures, objects, processes, routines or other programming elements. Further, it should be noted that the present invention may employ any number of conventional techniques for data transmission, signaling, data processing, network control, and the like.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

It should be appreciated that the particular implementations shown and described herein are illustrative of the invention and its best mode and are not intended to otherwise limit the scope of the present invention in any way. Indeed, for the sake of brevity, conventional data networking, data transfer, radio frequency data transfer, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It should also be noted that, as mentioned, the readable storage device may be configured for contact or contactless data transfer. As such, one skilled in the art understands that the "reader" described herein may be chosen to be compatible with the method of data transfer associated with the readable storage device. For example, where the readable storage device is a smartcard, the reader may be any smartcard reader, such as the smartcard reader disclosed in U.S. application Ser. No. 09/952,490, filed 12 Sep. 2001, entitled "Microchip-Enabled Online Transaction System," incorporated herein by reference in its entirety. In another exemplary embodiment, when the readable storage device includes a RFID transponder, the reader of the present invention may be a RFID reader such as that disclosed in U.S. application Ser. No. 10/192,488 noted above. However, for simplicity, the storage device is described as a RF fob.

A system 101 in accordance with an exemplary embodiment of the present invention is illustrated in FIG. 1. In an exemplary embodiment, system 101 includes a request for quote enrollment (RFQE) system 111, a communication channel 107, and a number (n) of request for quote (RFQ) providers 105. System 101 may optionally include a radio frequency operable transponder (e.g., fob) system 113. System 101 allows a user 109 to provide a request for quote (RFQ) to RFQ providers 105 via RFQE system 111.

In addition to making the RFQ, the user 109 may provide user specific identifying data (e.g., RFQE) to the RFQ provider 105 which may be used by the RFQ provider 105 to enroll the user 109 in a RFQ managed membership program. Thus, for example, the user 109 may provide the RFQE data to RFQE system 111, and RFQE system 111 may provide the user RFQE data to multiple RFQ providers 105. The RFQ providers 105 may enroll the user 109 in membership programs managed by each individual one of the providers 105, and may provide the user distinct quotes for products or services relative to each provider 105. In the latter instance, the quotes may be provided with respect to similar services or products, different services or products, a combination of services or products provided or performed by the providers 105. In this way, the user 109 may be given the opportunity to compare quotes to ensure that the user 109 is getting the best deal. Consequently, by registering in RFQE system 111, RFQE system 111 may facilitate the enrollment of a user 109 in multiple RFQ providers 105.

User 109 is typically a customer desiring to purchase and/or sell a product, service or other item of commerce to a supplier (not shown). In one embodiment, user 109 uses RFQ providers 105 as a liaison to various suppliers in order to purchase and/or sell a product or service. For example, where the user 109 wishes to sell a product, the user 109 may use RFQE system 111 to communicate the cost of the product (e.g. "quote") to multiple providers 105, which may provide the quote to multiple suppliers.

In another embodiment, the RFQ provider 105 may be a subsystem of a supplier system. In which case, the supplier may be, for example, an entity which customarily provides multiple quotes relative to differing user input information from a single user. For example, the supplier may be an insurance provider, airline company, or the like. As such, the terms "supplier" and "provider" are used interchangeably herein.

In another exemplary embodiment, RFQ provider 105 may be a subsystem for managing enrollment in a membership or incentive club. So, for example, upon receipt of the user data, the RFQ provider 105 may enroll the user 109 in one or more membership programs. However, to simplify the description of the present invention, RFQ provider 105 may be described as the liaison to various suppliers described above. In addition, please note that although the invention may be variously described with respect to enrollment, the invention is intended to include enrollment, submission and receipt of quotes and the like.

User 109 may alternatively be a merchant, a distributor, a supplier, a person, an entity, software, hardware and/or the like desiring to transact or otherwise communicate with a customer, a supplier, a distributor, and/or a manufacturer. In this manner, user 109 may transact or otherwise communicate in a business to business environment, a business to customer environment, and/or a customer to customer environment depending on the context of the transaction. User 109 may interact with the various elements of system 101 via any input device such as a keyboard, mouse, kiosk, personal digital assistant, handheld computer (e.g., Palm Pilot®), cellular phone, radio frequency transponder, smartcard, and/or the like. Alternatively, user 109 may interact with various elements of system 101 via a storage device such as a RFID transponder system 113, described more fully below.

RFQE system 111 includes a database 103 and is suitably configured to facilitate the enrollment of a user 109 in multiple RFQ providers 105. User 109 may register in RFQE system 111 by submitting data in connection with user 109 to RFQE system 111. In addition, each of RFQ providers 105 may register in RFQE system 111 by submitting data to RFQE system 111. The registration into RFQE system 111 may involve submitting data related to, for example, a user name, a user password, a reconfirmation password, a password recovery question, user contact information (e.g., name, title, company name, address, phone, facsimile, e-mail, and/or the like), industry or market information, company information, product or services categories, user personal information (e.g., citizenship, racial background, etc.), and/or the like. In addition, RFQE system 111 assists users with, for example, data security, non-preferential branding among competitors, catalog and inventory maintenance and/or the like.

User 109 and RFQ providers 105 may use any suitable communication means (e.g., communication channel 107 or radio frequency channel 115) to submit the data to RFQE system 111. Communication channel 107 may be any type of communication means which provides any form of communication between the various elements (e.g., between RFQE system 111 and RFQ providers 105 or between RFID reader 117 and RFQE system 111). Thus, communication channel 107 may be RF infrared, optical, or any suitable channel for communicating between devices as required. It should be appreciated, that many applications of the present invention could be formulated. One skilled in the art will appreciate that communication channel 107 may include any system for exchanging data or transacting business, such as any hardware and/or software communication medium (e.g., telephone, modem, digital subscriber line, a global computer network, a wired link, a wireless link, any utility link), the Internet, an intranet, an extranet, WAN, LAN, satellite communications, and/or the like. It is noted that communication channel 107 may be implemented as any type of network, such as open network, secured network, an interactive television (ITV) network. Furthermore, communication channel 107 may be one network or multiple independent networks. The invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like.

The RFQE system 111 may include a RFID reader 117 operable to provide a RF interrogation signal for powering transponder system 113, receiving a transponder system 113 RF signal and authenticating or verifying the user identity. The RF interrogation signal may be provided via channel 115. Channel 115 may be radio frequency, electromagnetic, infrared or the like. Transponder system 113 may include one or more transponders (e.g., modules) responsive to one or more interrogation signals provided by RFID reader 117. Transponder system 113 may include a database (not shown) for storing the user information required by RFQ 105, and for providing the required information when the transponder is interrogated by RFID reader 117. A typical transponder system for use with this invention may include, for example, the system described in detail in U.S. application Ser. No. 10/192, 488 noted above.

The transponder system 113 may be embodied in a fob, tag, transaction card, smartcard, watch, or any other presentable form factor (e.g. wristwatch, key chain, cell phone, etc.). Traditional methods of data transfer and securing data transfer using RF transponders and/or smartcards and RFID readers and/or smartcards are well known. One skilled in the art will appreciate that such methods may be used with system 101, and are considered a part thereof.

The data submitted from user 109, transponder system 113 via reader 117 and/or RFQ providers 105 to RFQE system 111 may optionally be stored in database 103 (e.g., back-up data, tracking information, and/or the like). A database, e.g., database 103, may be any type of database, such as relational, hierarchical, object-oriented, and/or the like. Common database products that may be used to implement each database include DB2 by IBM (White Plains, N.Y.), any of the database products available from Oracle Corporation (Redwood Shores, Calif.), Microsoft SQL Server by Microsoft Corporation (Redmond, Wash.), or any other database product. Each database may be organized in any suitable manner, including as data tables or lookup tables. Thus, upon submitting the data to RFQE system 111, user 109, transponder system 113 and/or RFQ providers 105 are registered in RFQE system 111.

Once RFQE system 111 obtains the data, user 109 and/or transponder system 113 may be enrolled with any number (n) of RFQ providers 105. For example, user 109 may complete one integrated enrollment form on a web site (e.g., completing a user enrollment form at www.americanexpress.com). Alternatively, a user 109 may complete an application for membership in a program of which a transponder system 113 is a part. For example, the transponder system may be associated with a credit, checking, debit, loyalty account or the like. To enroll in the program, the user may provide complete integrated enrollment forms. The information provided by the user 109 may be stored in a transponder system 113 database, and may be provided to RFQE system 111 upon presentation of the transponder system 113 to an interrogation signal from the RFID reader 117.

RFQ providers 105 include any RFQ providers, e.g., Onvia.comSM, BuyerZone.comSM, SmallBusinessDepotSM, and/or the like or may include providers requiring user enrollment before service or products are provided. In addition, the number n of RFQ providers 105 may be any number depending on the needs and context of system 101. In an alternate exemplary embodiment of the present invention, RFQE system 111 may itself include any number of RFQ providers, such that RFQ providers 105 are included within RFQE system 111.

Once user 109 is registered in RFQE system 111, then data in connection with user 109 may be communicated to multiple RFQ providers 105 (e.g., by using the integrated enrollment form information or transponder system 113, as discussed below); RFQE system 111 communicates the data to RFQ providers 105 via communication channel 107. RFQE system 111 communicates the data to RFQ providers 105 by transmitting, transferring, or otherwise communicating the data to RFQ providers 105 via communication channel 107. For example, RFQE system 111 may configure the data for simultaneous transfer to multiple RFQ providers 105. RFQE system 111 may configure the data using for example server 119. The computing units used by user 109, RFQE system 111, and RFQ providers 105 may be connected with each other via communication channel 107 (e.g., a data communication network). The network may be a public network and assumed to be insecure and open to eavesdroppers. In the illustrated implementation, the network may be embodied as the internet. In this context, the computers may or may not be connected to the internet at all times. For instance, a user computer may employ a modem to occasionally connect to the internet, whereas an RFQE system or universal service system computing center might maintain a permanent connection to the internet. Various systems and servers are suitably coupled to the network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. The various systems might also reside within a local area network (LAN) which interfaces to the network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

RFQE system 111 may exchange the data transmission with RFQ providers 105 using at least one protocol in at least one format. For example, RFQE system 111 may configure the data in a format and communicate the data to RFQ providers 105 using a protocol (e.g., sending enrollment information to RFQ providers 105 via a business-to-business communication channel (e.g., using https and XML)). In one exemplary embodiment of the present invention, RFQE system 111 and RFQ providers 105 may have a predetermined protocol and format in order to facilitate the communication of the data from RFQE system 111 to RFQ providers 105. Thus, once the data is communicated to RFQ providers 105, then RFQ providers 105 process the data in order to enroll user 109 into each of their respective systems. As such, user 109 becomes enrolled with RFQ providers 105.

Exemplary protocols include hyper text transfer protocol (http), secured hyper text transfer protocol (https), file transfer protocol, secure electronic mail, a network, remote method invocation, distributed component object model, enterprise java bean, and/or socket communication. One embodiment of the present invention may be implemented with TCP/IP communications protocols, IPX, Appletalk, IP-6, NetBIOS, OSI or any number of existing or future protocols. For a basic introduction of cryptography, please review a text written by Bruce Schneier which is entitled "Applied Cryptography: Protocols, Algorithms, And Source Code In C," published by John Wiley & Sons (second edition, 1996), which is hereby incorporated by reference. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

Exemplary formats include extensible markup language (XML), name value pair, any custom format, any industry standard format, and/or the like. For example, XML is a markup language for documents including structured information. Structured information includes content (e.g., words, pictures, and/or the like) and some indication of the type of content (e.g., heading, footnote, figure, database table, etc.). In this manner, a markup language can identify structures in a document (e.g., by adding markup to the document). Documents include, for example, traditional documents, vector graphics, electronic commerce transactions, mathematical equations, object meta-data, server Application Programming Interfaces, and/or the like. The XML language (e.g., XML schemas) may describe and constrain the content of XML documents.

Upon successful enrollment with RFQ providers 105, user 109 receives notification of the enrollment. The notification may be communicated to user 109 from RFQE system 111, via RFQE system 111 and RFID reader 117, via RFID reader 117 and transponder system 113 and/or RFQ providers 105. For example, user 109 may be notified of the enrollment and requested to submit further information to RFQE system 111 and/or RFQ providers 105. In addition, user 109 may submit further data directly to RFQ providers 105. For example, user 109 may submit profiling or demographic information and/or the like directly to RFQ providers 105.

Once the data is communicated from RFQE system 111 to RFQ providers 105, then RFQ providers 105 may use the data to provide one or more quotes to user 109 and/or to solicit one or more quotes from a supplier (not shown). In this manner, RFQ providers 105 may behave as an RFQ provider, a supplier, a merchant, a distributor, a manufacturer, and/or the like. A quote may include a bid on a product or service, information on a product or service, and/or the like. A quote may be in relation to any product or service that user 109 may have an interest in or is offering for sale, and may further be based on information on user 109 (e.g., profiling information on user 109). The supplier may be a seller, a merchant, an RFQ provider, a manufacturer, and/or any other entity related to providing, obtaining, and/or securing the quote. If the quote is obtained from the supplier, then the quote is communicated to at least one of RFQ providers 105. Once any of RFQ providers 105 receive a quote from the supplier or can otherwise provide a quote, RFQ providers 105 may communicate the quote to user 109. RFQ providers 105 may communicate the quote to user 109 via any means including a hard copy, a soft copy, an electronic copy (e.g., electronic mail, any protocol, any format, etc.), a communication channel, and/or the like. Alternatively, the quote may be directly communicated from the supplier to user 109.

Upon receiving the quote from any of RFQ providers 105 or otherwise, user 109 may accept, reject, or ignore the quote. User 109 may communicate the decision to accept, reject, or ignore the quote to RFQ providers 105 and/or RFQE system 111 via any communication means. For example, user 109 may send an electronic mail message to RFQ providers 105 and/or RFQE system 111 signifying acceptance or rejection of the quote. In one exemplary embodiment of the present invention, user 109 receives one or more quotes from a web site of any of RFQ providers 105. As such, user 109 may access the web site of any of RFQ providers 105 to receive and respond to one or more quotes.

If user 109 ignores the quote or rejects the quote, then user 109 is not affected by the quote (e.g., user 109 is not legally or financially obligated in connection with the quote). If, however, user 109 accepts the quote from any of RFQ providers 105 and/or the supplier, then user 109 may be obligated (e.g., legally, financially, or otherwise). For example, user 109 may be obligated to provide further information to RFQ providers 105, provide a product or service, and/or pay a fee (e.g., pay a commission to RFQ providers 105). As such, the RFQ provider, from which user 109 accepted the quote, may bill user 109, if user 109 accepts that quote from that RFQ provider. In addition, RFQ providers 105 may also be obligated (e.g., legally, financially, or otherwise) to pay RFQE system 111 and/or the supplier a fee (e.g., flat fee, commission, and/or the like). Thus, user 109 may be obligated to RFQ providers 105 and/or RFQE system 111 (or RFQ providers 105 may also be obligated RFQE system 111) due to previously determined relationships (e.g., prior executed/signed agreements).

In one instance, the RFQ providers 105 may provide one or more quotes to the RFQE system 111. The quotes may then be provided to transponder system 113. The quotes may be stored on a transponder system database 121 or a database maintained by the provider 105, where each database may be of similar description as database 103.

The RFQ providers 105 may provide a unique quote identifier correlative to the specific quote provided. The unique quote identifier recognizable by the RF provider 105 as being unique to a specific user 109. The unique quote identifier may be stored, for example, on database 121. As noted, the user 109 may choose to accept or deny a quote. If a particular quote is accepted, the user 109 may provide the acceptance and the unique quote identifier to the RFQ provider 105. The quote identifier may be provided via the USB connector 123 in communication with a computer system (not shown) in communication with RFQ provider 105.

The RFQ provider 105 may receive the unique identifier and correlate the identifier to a user 109. For example, the received unique identifier may be compared to a plurality of unique identifiers stored on a database (not shown) maintained by the provider 105. Where there is a match, the provider 105 may recognize the unique identifier as corresponding to a user enrolled in a provider 105 membership or incentive program. The RFQ provider 105 may then provide incentives (e.g. reward or loyalty points) to the user 109 based on the acceptance of the quote and/or the nature of the quote or any other criteria as determined by the RFQ provider 105. The incentive may include a correlative value redeemable by the user 109 for goods and services. The incentives may be provided to the transponder system 113 along with the quote, and prior to acceptance of the quote by the user 109. The incentive value may be stored in a database location for activation upon acceptance by the user. For example, where the incentive value is provided to a transponder system 113, the incentive value may be stored in a database 121, and may be activated upon subsequent interrogation of the transponder system 113 by, for example, a RFID reader 117 in communication with the RFQ provider 105. Alternatively, the incentive value may be stored in a database location on a supplier system (e.g., RFQ provider 105 system) in communication with the RFQ provider 105. Alternatively, the incentive value may be stored in a database location on a supplier system and may be redeemed by the user 109 at the supplier location, telephonically, or online via a computer system (not shown) in communication with the supplier system. In one example, the user 109 may provide the unique quote identifier to redeem the incentive value.

In an exemplary embodiment of the present invention, all obligations (e.g., legal, financial, or otherwise) between user 109, RFQ providers 105, RFQE system 111, and/or third parties are coordinated by RFQ providers 105. For example, RFQ providers 105 would service any requests by user 109 and/or the supplier related to payment of financial obligations, legal obligations, customer complaints, and/or the like. Optionally, RFQ providers 105 may report such obligations to RFQE system 111 for tracking information. Such information related to the obligations of user 109 may form the basis for determining any fees owed to RFQE system 111 by user 109 and/or RFQ providers 105. Such information may include enrollment information, quote acceptance/rejection information, revenue information, attrition information, customer issues, and/or the like. Alternatively, obligations (e.g., legal, financial, or otherwise) between user 109, RFQ providers 105, RFQE system 111, and/or third parties may be coordinated directly between each party.

Figure 4:
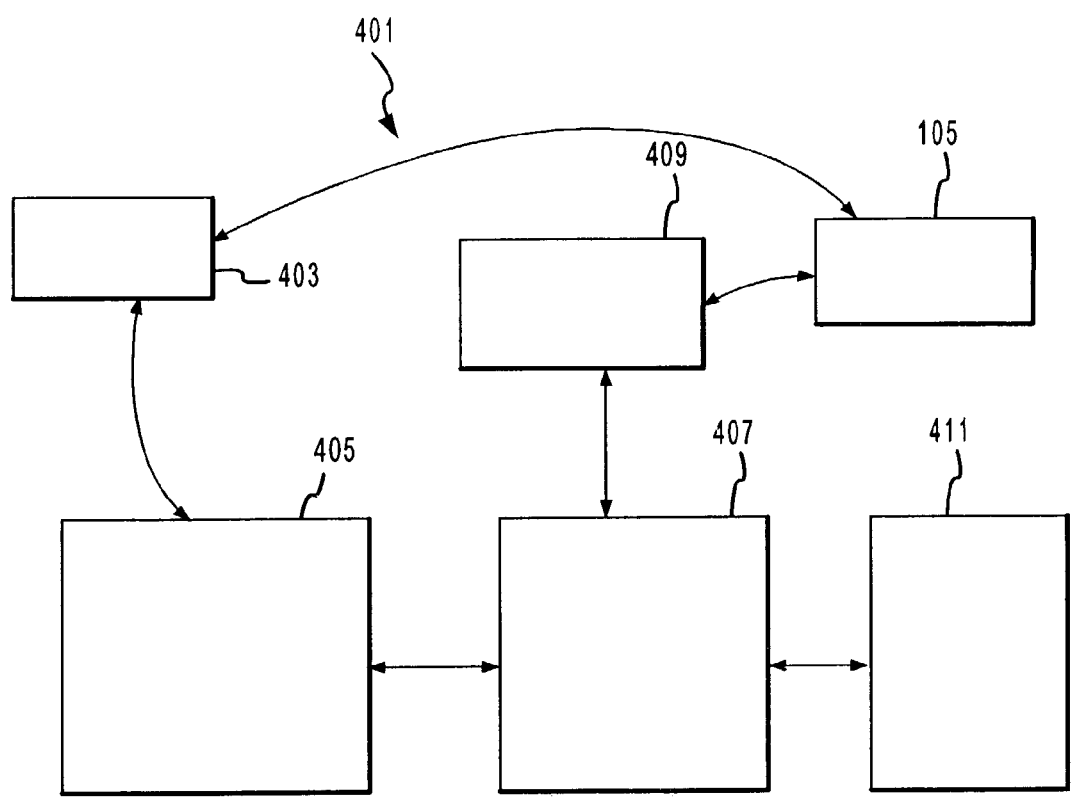
FIG. 4 illustrates a system for enrolling a browser with multiple transaction environments using an RFQE, system having a web server, an application server, an outbound proxy server, and a database server in accordance with an exemplary embodiment of the present invention.

System 401 in FIG. 4 illustrates an alternate embodiment of the present invention. System 401 includes a browser 403 (e.g., user 109) which posts an application form, so that browser 403 may submit data to a web server 405. In this manner, browser 403, may register with RFQE system 111 and/or enroll in a supplier system including a transponder system 113. An exemplary embodiment of RFQE system 111 includes web server 405, an application server 407, an outbound proxy server 409, and a database server 411. Browser 403 passes input field values, e.g., using https, to web server 405. As such, browser 403 submits data to web server 405 and web server 405 sends the data to application server 407. Data from the application server 407 may be stored in and retrieved from a database server 411. Application server 407 transmits the data to RFQ providers 105 via outbound proxy server 409. For example, application server 407 transmits the data to outbound proxy server 409 in XML format. Outbound proxy server 409 may transfer the data to and receive data from RFQ providers 105 using https and an XML format. Accordingly, by transferring data to and receiving data from RFQ providers 105, browser 403 may be enrolled with multiple RFQ providers 105. Thus, browser 403 may receive one or more quotes from RFQ providers 105 either directly, or indirectly via outbound proxy server 409, application server 407, and web server 405.

It should be understood that, although FIG. 4 is described with respect to RFQ providers 105, the system 401 is not so limited. For example, system 401 may be used to enroll a user 109 in multiple supplier, provider, merchant and/or any other entity's incentive programs as described above. In this instance, browser 403 may submit the data to a web server 405. The web server 405 may send the data to application storage 407 which may transmit the data to multiple suppliers or merchants. The user 109 may then be enrolled in the membership programs relative to each supplier or merchant.

In one embodiment, the supplier may provide a unique membership number to the user 109. The membership number may be provided via outbound proxy server 409, web server 405 and/or browser 403. In another embodiment, the supplier may provide a membership number in any traditional card, key ring tag, fob and/or other suitable form. In yet another exemplary embodiment, the membership number may be stored in a database at a supplier location. It should be noted, that although the unique membership number provided by the supplier is termed a "number," the invention contemplates that the membership number may be any suitable unique indicia for use in identifying a user 104. In that regard, the membership number may be numericized, alpha numerical, symbolic or the like.

The membership number may then be uploaded to a transponder system 113 and stored on transponder system database 121. For example, the membership number may be provided to the transponder from the provider 105 via the supplier reader 131 to the transponder system reader 117 to the transponder system 113, using various RF, optical and electrical communications as appropriate. The transponder system 113 may receive the membership number and store the membership number on the database 121 upon presentation of (and interrogation of) a transponder system 113. The membership number may be stored automatically or upon request by the user 109. For example, in one exemplary embodiment, the user 109 may request that the membership number be loaded on the database 121. Furthermore, where the user 109 elects to enroll in more than one membership program managed by one or more suppliers, multiple membership numbers may be stored on the database 121. The multiple stored membership numbers may be retrieved upon interrogation by a supplier/provider RFID reader and the number may be transferred in any traditional manner in which transponders and RFID readers may communicate. That is, the number may be encrypted, unencrypted, modulated, parsed, transferred in magnetic stripe format or the like.

Figure 5:
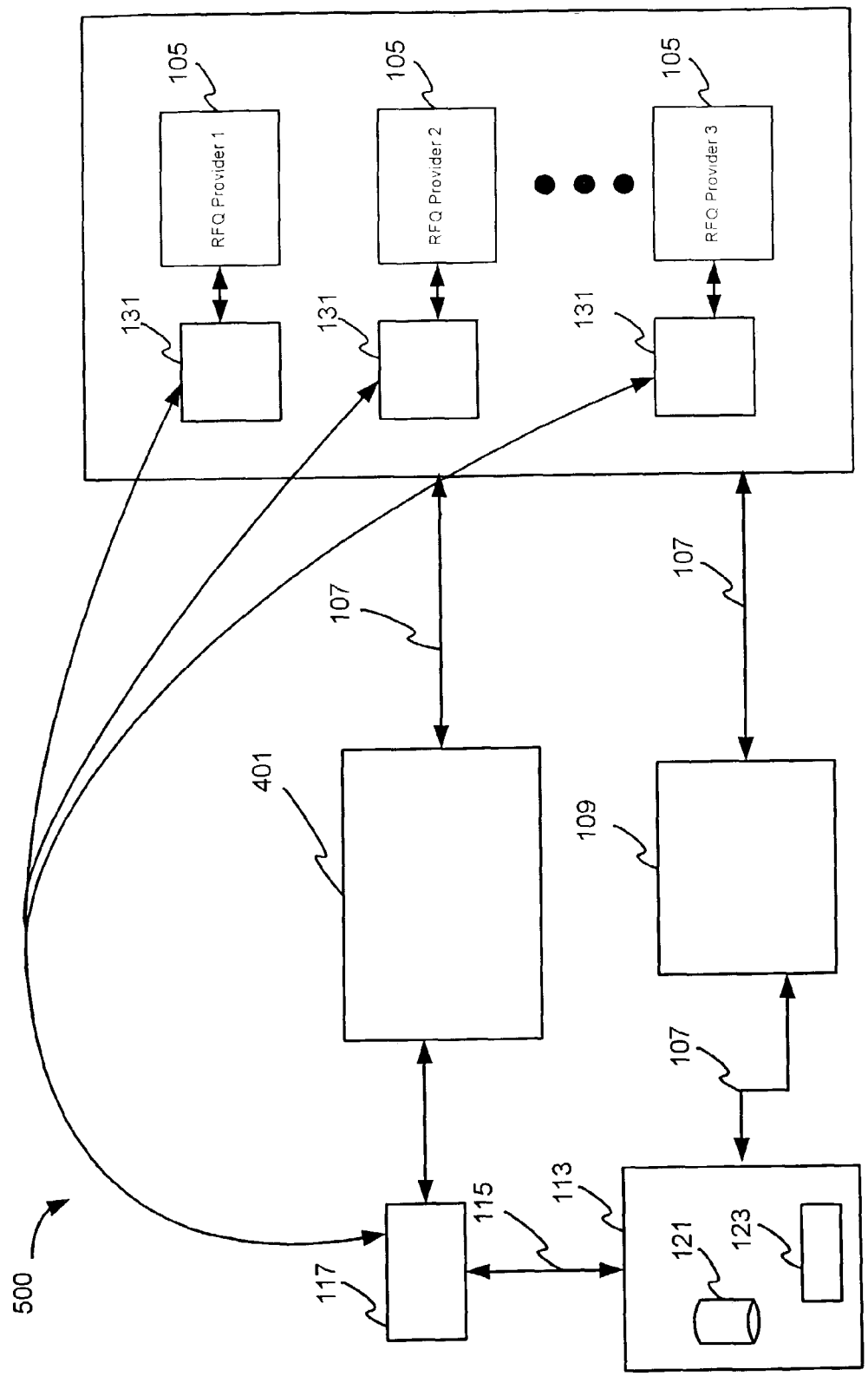
FIG. 5 illustrates a system for enrolling a user in multiple membership program environments in accordance with an exemplary embodiment of the present invention.
Figure 6:
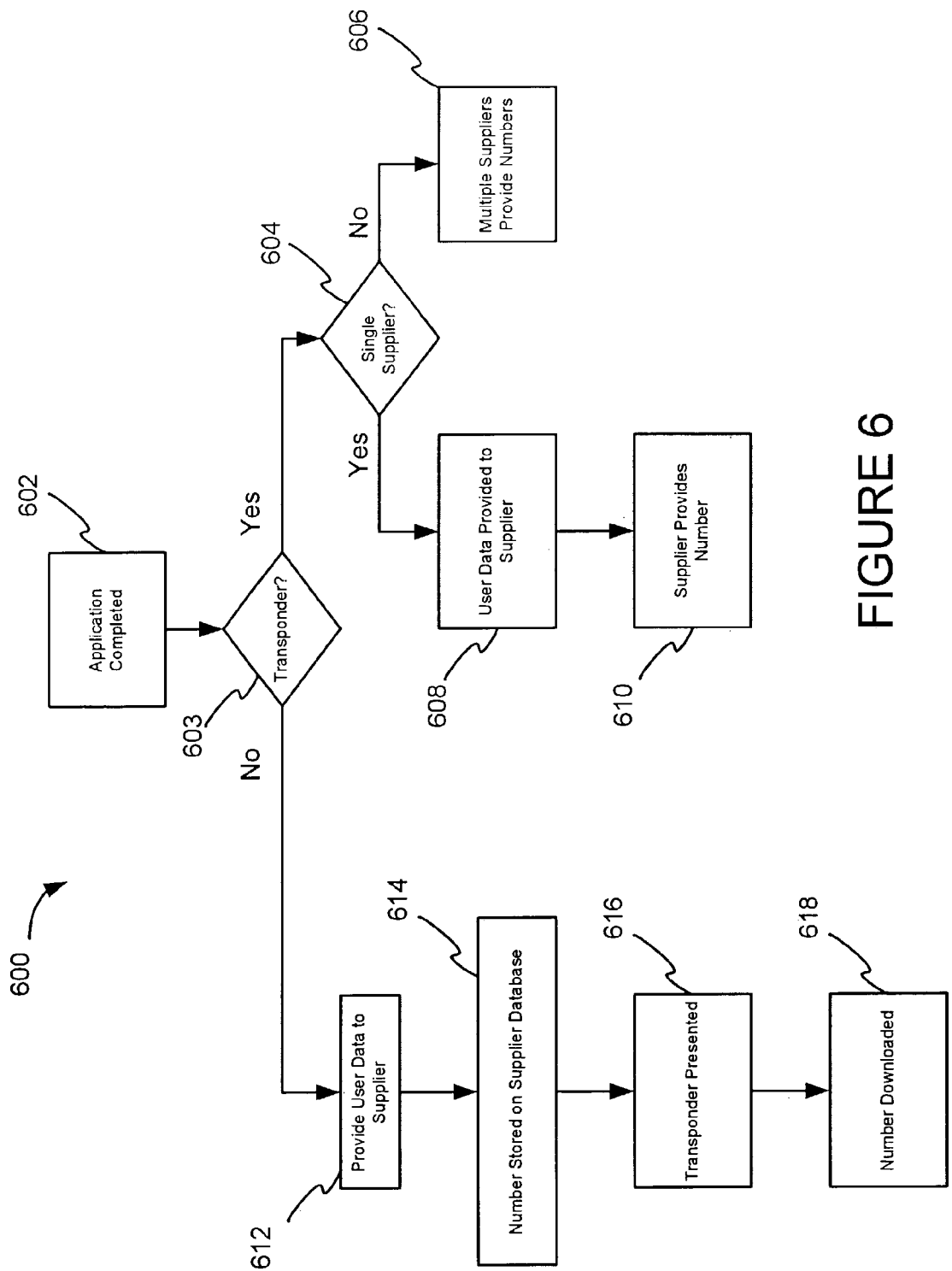
FIG. 6 illustrates an exemplary method for use with a system for enrolling a user in multiple membership program environments in accordance with an exemplary embodiment of the present invention.

With reference to FIGS. 5-6, an exemplary enrollment system 500 and exemplary method 600 for enrolling a user 109 in multiple membership program systems managed by a supplier 105 is shown. It should be noted that with reference to enrollment of a user 109 in a membership program, RFQ providers 105 are termed supplier systems 105 herein, to facilitate understanding of the description.

As shown, a user 109 may be in communication with an enrollment system 401 for providing user 109 data to supplier systems 105. Alternatively, the user 109 may provide the required data directly to the supplier system 105. In either case, user 109 may complete an enrollment application to provide the required data to the supplier system 105 (step 602). The user 109 may complete the enrollment application using, for example, a transponder system 113 and/or system 401, described with respect to FIG. 4. Alternatively, the user may provide the information to the supplier system 105 through manually completing an enrollment application and providing the application directly to the system 105.

Where the user elects to enroll using system 401, the user 109 may provide the user 109 data by completing an enrollment application posted on the browser 403 as described above. Alternatively, the user 109 may provide the data to system 401 using transponder system 113, wherein the user data is stored on and retrieved from the transponder system 121 database. The user 109 data may be provided from the transponder system database 121 to the system 401 by for example, transferring the data via the bus connector 123 to system 401. In another exemplary embodiment, the user 109 data may be provided to the system 401 via reader 117. That is, for example, the reader 117, may be used to retrieve the data from database 121 and provide the data to system 401 using contact or contactless communications.

Upon receiving the user 109 data, the system 401 may provide the user 109 data to multiple supplier systems 105 (step 604). The supplier systems 105 may provide unique membership numbers to the user 109 via system 401. Each membership number may individually and uniquely correspond to a distinct user 109 as recognized by the providing supplier 105. The numbers may be provided to the user 109 via system 401, and/or via hand delivery, but is preferably provided to the transponder system 113 via, for example, a RFID reader 117 in communication with system 401 in a similar manner as was described with respect to RFQE 111 system. In which case the multiple numbers may be transmitted to transponder system 113 via RFID reader 117. The multiple numbers may then be received by transponder system 113 and stored in database 121 (step 606).

Alternatively, rather than using system 401, user 109 may complete an application and provide the application to a supplier (step 608). The membership number may be automatically provided to transponder system 113 via an RF communications channel 115, where the number may be stored on database 121 (step 610). It should be understood that the user 109 may complete various individual applications at various suppliers 109, such that steps 608 and 610 may be repeated resulting in multiple numbers being stored on database 121.

In another arrangement, the user 109 may elect to complete the enrollment application without use of the transponder system 113 (step 603). The membership numbers may be loaded into the transponder system database at a later time. The application may be completed using a system 401, or such that the application may be provided to the supplier 105 at a later time. The supplier systems 105 may receive the application and complete the enrollment process thereby assigning a unique membership number to the user 109. The membership number may be stored on a supplier 105 database (not shown)(step 614). The user 109 may then present the transponder system 113 for interrogation at a RFID reader 131 managed by the supplier system 105 (step 616) where the RFID reader may have similar construction and operation as RFID reader 117. The number may then be downloaded into transponder system database 121. The membership number may be loaded automatically (step 618) or at the request of the user 109. Further, the user 109 may present the transponder system 113 to any supplier with which the user 109 has completed an application and which supplier system 105 configured to interrogate transponder system 113 and provide system 113 the membership number for loading into database 121. In this way, transponder system 113 may store in database 121 multiple unique membership numbers.

Figure 7:
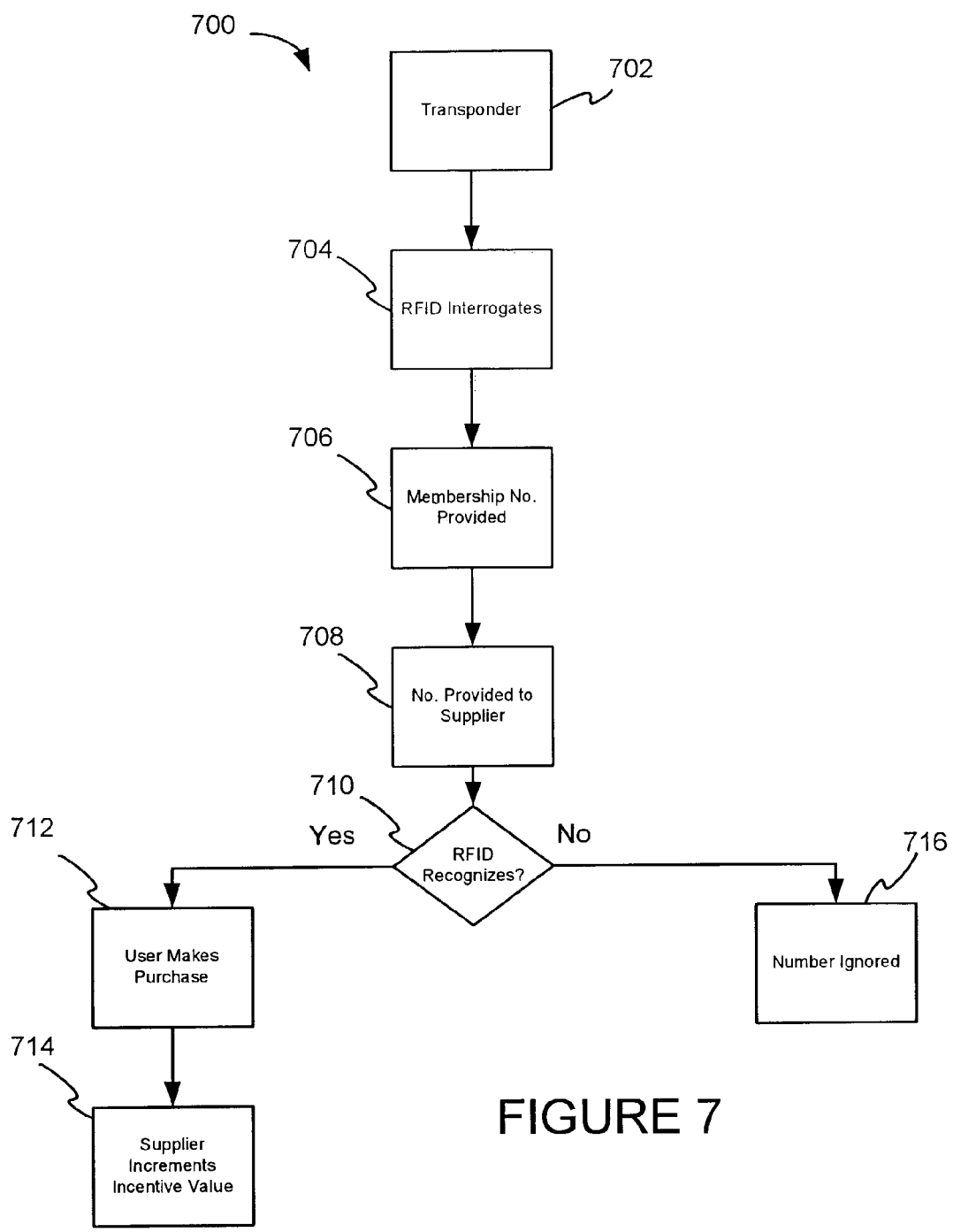
FIG. 7 illustrates an exemplary incenting method for use with an exemplary embodiment of the present invention.

FIG. 7 is an exemplary method for presentation of a transponder system 113 including a member number stored in database 121. The transponder system 113 may be presented to a RFID reader 131 managed by supplier system 105 (step 702). The transponder system 113 may be presented by waiving the transponder system 113 in proximity to the supplier RFID reader 131. The RFID reader 131 may provide an interrogation signal for powering transponder system 113 (step 704).

Upon being interrogated, the transponder system 113 may provide the membership number from database 121 to the RFID reader 131 (step 706). The RFID reader 131 receives the membership number and provides the number to supplier 105 for associating with the transponder system 113 (e.g., user 109) (step 708). Where multiple membership numbers are provided by transponder system 113, the supplier system 105 compares the membership numbers to those stored on the supplier system (step 710) database. The supplier system 105 may ignore those membership numbers it does not recognize (step 716). That is, the RFID reader 113 (or supplier 105) may authenticate that the membership number is valid for providing the user 109 access to the supplier 105 system. Moreover, the reader 113, supplier 105 and/or RFQE system 111 may use the membership number to authenticate that the user 109 is indeed authorized to use the transponder system 113 (e.g., storage device). Such authentication may include verification of user 109 identity using a personal identification number (PIN), biometric or ocular identification or the like.

As noted, the transponder system 113 may include in database 121 a data file for storing an incentive value. Where the user 109 uses the transponder system 113 to make a purchase of goods or services (step 712), the supplier system 105 may provide incentive points to the transponder system 113 via supplier RFID reader 131, incrementing the incentive data file stored in database 121 (step 714).

The incentive points may be redeemed for products or services by presenting the transponder system 113 to a supplier RFID reader as discussed above. Once the user 109 makes a purchase using the transponder system 113, the supplier may query the user as to whether at least a portion of the payment for the requested goods or services is to be made using the incentive points. If the user 109 elects to use the incentive points, the supplier system 105 may interrogate the transponder system 113 and retrieve the appropriate incentive points for payment for the goods and services, thereby reducing the value of the incentive data file accordingly.

For more information on loyalty systems, transaction systems, electronic commerce systems and digital wallet systems, see, for example, U.S. patent application Ser. No. 09/836,213, filed on Apr. 17, 2001 by inventors Voltmer, et al. and entitled System And Method For Networked Loyalty Program; U.S. Continuation-In-Part patent application Ser. No. 10/027,984 was filed on Dec. 20, 2001 by inventors Ariff, et al. and is entitled System And Method For Networked Loyalty Program; U.S. Continuation-In-Part patent application Ser. No. 10/010,947 was filed on Nov. 6, 2001 by inventors Haines, et al. and is entitled System And Method For Networked Loyalty Program; U.S. Continuation-In-Part patent application Ser. No. 10/084,744 was filed on Feb. 26, 2002 by inventors Bishop, et al. and is entitled System And Method For Securing Data Through A PDA Portal; the Shop AMEX™ system as disclosed in Ser. No. 60/230,190 filed Sep. 5, 2000; the MR as Currency™ and Loyalty Rewards Systems disclosed in Ser. No. 60/197,296 filed on Apr. 14, 2000, Ser. No. 60/200,492 filed Apr. 28, 2000, Ser. No. 60/201,114 filed May 2, 2000; a digital wallet system disclosed in U.S. Ser. No. 09/652,899 filed Aug. 31, 2000; a stored value card as disclosed in Ser. No. 09/241,188 on Feb. 1, 1999; a system for facilitating transactions using secondary transaction numbers disclosed in Ser. No. 09/800,461 filed on Mar. 7, 2001, and also in related provisional application Ser. No. 60/187,620 filed Mar. 7, 2000, Ser. No. 60/200,625 filed Apr. 28, 2000 and Ser. No. 60/213,323 filed May 22, 2000, all of which are herein incorporated by reference. Other examples of an online membership reward systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

Figure 2:
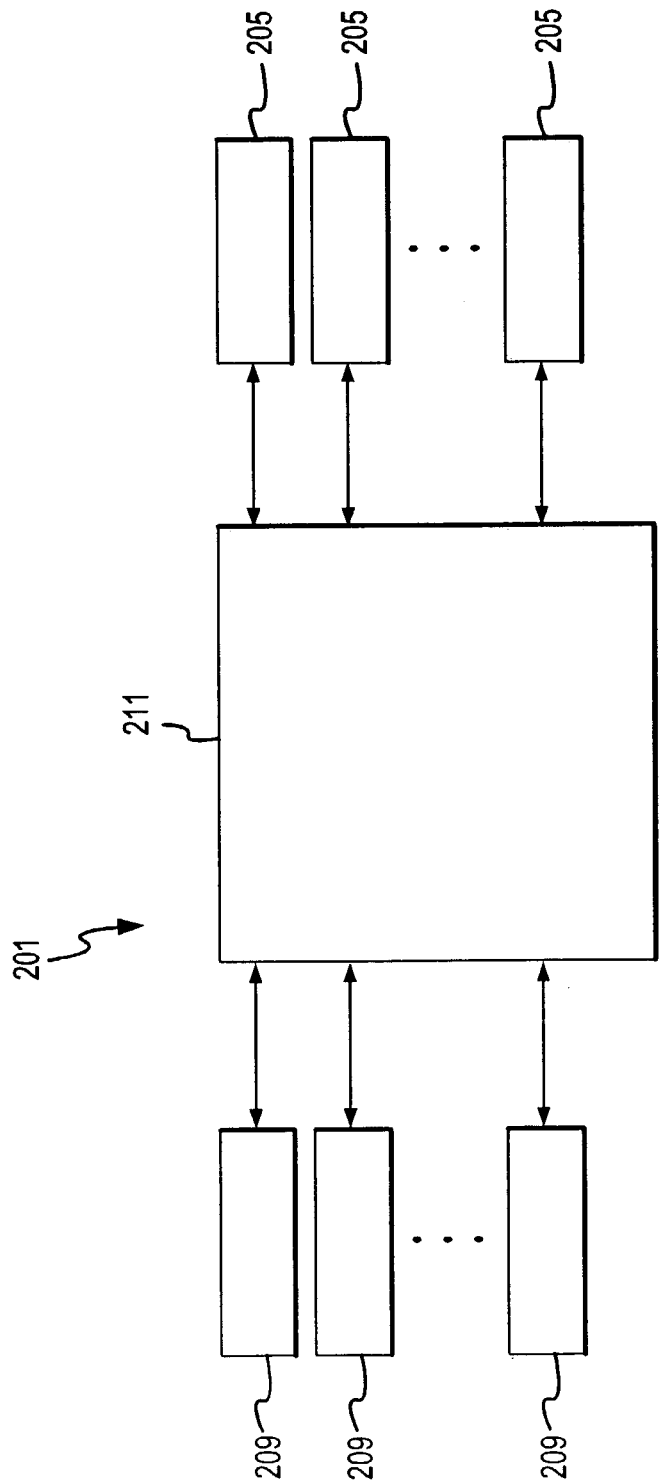
FIG. 2 illustrates a system for enrolling a user with multiple suppliers in accordance with an exemplary embodiment of the present invention.

Referring to FIG. 2, system 201 illustrates another alternate embodiment of the present invention. System 201 includes a universal service system 211, a number of users 209, and a number of suppliers 205. Universal service system 211 facilitates communication and/or interaction between one or more users 209 and multiple suppliers 205. Users 209 and suppliers 205 may be in the context of a business to business transaction, a business to customer transaction, a customer to customer transaction, and/or the like. Similar to RFQF system 111 of FIG. 1, universal service system 211 facilitates communication between users 209 and suppliers 205. System 201 may be implemented in any context in which a user desires facilitated access to or communication with multiple suppliers. For example, system 201 may include an electronic auction system, which facilitates communication between users 209 (e.g., auction buyers) and suppliers 205 (e.g., auction sellers), such as the system on www.ebay.com, which is hereby incorporated by reference. Moreover, system 201 contemplates the use, sale or distribution of any goods, services, items of commerce or information over any network having similar functionality described herein.

In order to further describe the present invention, the following provides further exemplary embodiments for the various elements of the present invention. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example. Also, the association of XML data is done using Document Type Definition (DTD) and schemas.

Communication between the various entities and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Each entity may use a computing system to facilitate online commerce transactions. The user may use a computing unit in the form of a personal computer, although other types of computing units may be used including laptops, notebooks, hand held computers, set-top boxes, and the like. RFQE system 111, universal service system 211, RFQ providers 105, and/or suppliers 205 may use a computing unit implemented in the form of a computer server, a computing center (e.g., a main frame computer), a mini-computer, a PC server, a network set of computers, and/or the like.

Optionally, a user computing unit, an RFQ provider computing system, an RFQE system, a universal service system, and/or a supplier computing unit may be interconnected via a second network, such as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network.

Figure 3:
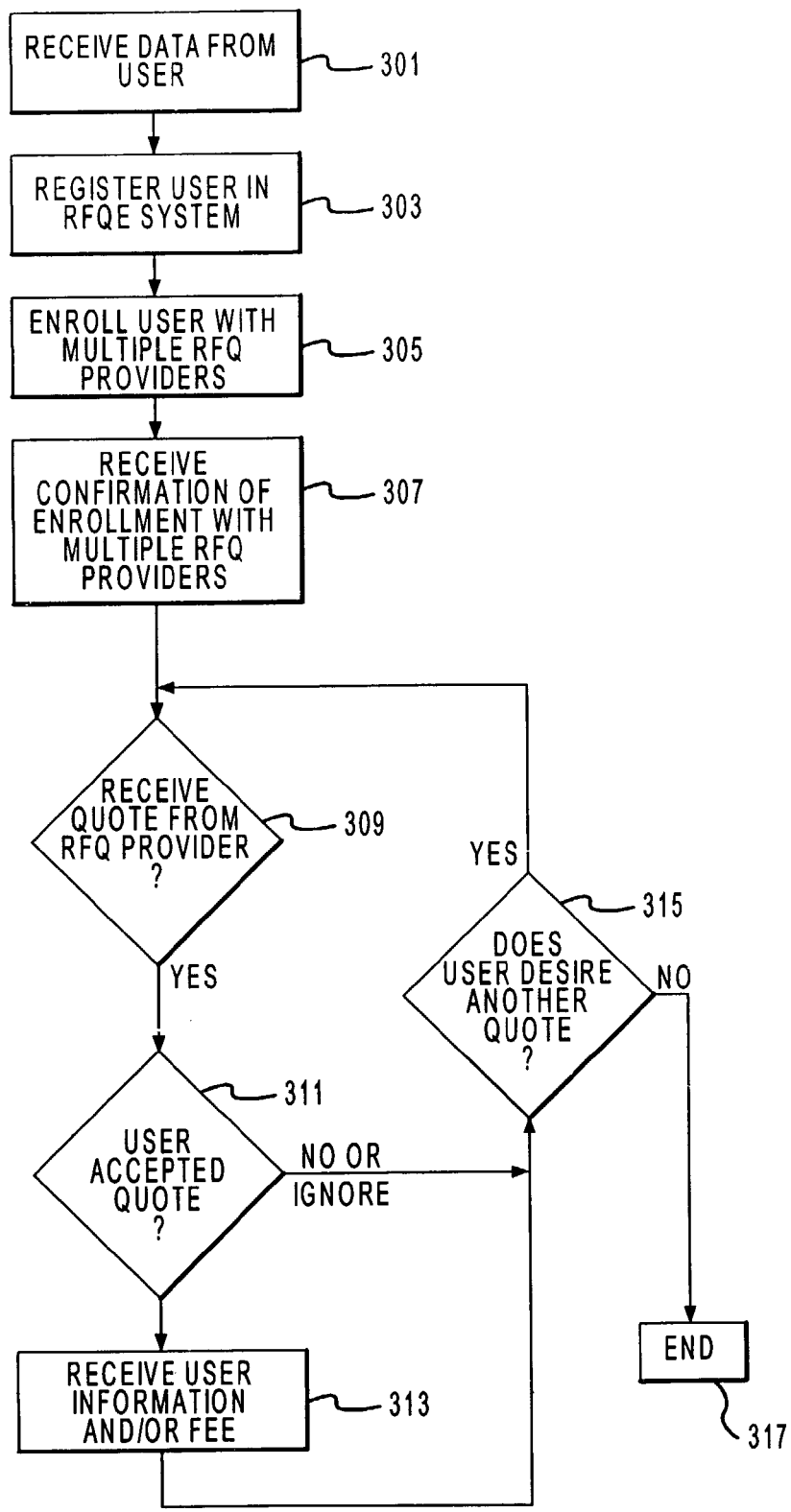
FIG. 3 is a flowchart illustrating a method for facilitating enrollment of a user with multiple RFQ providers in accordance with an exemplary embodiment of the present invention.

An exemplary method of the present invention is illustrated in the flowchart of FIG. 3. This exemplary embodiment of the present invention may be implemented in any context as well, and is described in the context of an RFQ system for illustrative purposes only. System 101 may receive data in connection with at least one user (e.g., user 109) (step 301). In one exemplary method of the present invention, RFQE system 111 receives data in connection with user 109. Once the data is received, user 109 may be registered in RFQE system 111 (step 303). Once user 109 is registered in RFQE system 111, then RFQE system 111 may enroll user 109 with multiple RFQ providers 105 (step 305). Upon being enrolled with RFQ providers 105, confirmation of the enrollment is communicated to RFQE system 111 and/or user 109 (step 307). After registration with RFQ providers 105, user 109 may receive one or more quotes (e.g., from RFQ providers 105) (step 309). If user 109 does not receive a quote, then the process reiterates until either user 109 receives a quote or a predetermined amount of time has lapsed (e.g., some number of iterations of checking for receipt of a quote). Once user 109 receives a quote from an RFQ provider, then user 109 may accept, reject, or ignore the quote. If user 109 accepts the quote in step 311, then user 109 may be obligated to provide further information, provide a product or service, and/or pay a fee (step 313). If, however, user 109 rejects or ignores the quote, then user 109 has no obligation to submit further information or pay a fee in connection with that quote. Upon rejecting or ignoring the quote (step 311) or accepting the quote (step 313), a check is made to determine if user 109 desires to receive another quote from any of RFQ providers 105 (step 315). If user 109 desires to receive another quote from any of RFQ providers 105, then step 309 is repeated. If, however, user 109 does not wish to receive another quote from any of RFQ providers 105, then this exemplary iteration of an RFQ process ends (step 317). This exemplary method may continue for any number of users in connection with any number of quotes from any number of RFQ providers 105.

Thus, the present invention provides methods and apparatus for facilitating the enrollment of a user with multiple RFQ providers. By registering the user in an RFQE system, the RFQE system may enroll the user with multiple RFQ providers thereby facilitating communication between the user and the various RFQ providers. Instead of the user to communicating directly with each RFQ provider and enroll individually with each RFQ provider, the present invention allows the user to register in one integrated RFQE system. The RFQE system may then enroll the user with multiple RFQ providers thereby facilitating the enrollment process for the user. Thus, the user may use one integrated RFQE system and register just one time, but receive the benefit of enrolling with multiple RFQ providers.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A system for membership enrollment comprising:
   an enrollment system including an enrollment system server configured to process user data in connection with a user;
   a first supplier system configured to provide a first membership indicia to said enrollment system in response to said user data provided for enrollment in a first membership program;
   a second supplier system configured to provide a second membership indicia to said enrollment system in response to said user data provided for enrollment in a second membership program, said second membership indicia different from said first membership indicia;
   a readable storage device including a database configured to store said first and second membership indicia, and said user data;
   an enrollment system reader in communication with said readable storage device and said enrollment system server, said enrollment system reader receiving said user data;
   wherein said enrollment system reader notifies said user of enrollment of a third supplier system and initiates a request for additional user data from the user in response to said enrollment of said third supplier system in order to be supplied to said third supplier system.

2. The system according to claim 1, wherein said enrollment system reader is in communication with said enrollment system for providing said user data to said first and second suppliers.

3. The system according to claim 1, wherein said enrollment system server is configured to provide said first and second membership indicia to said readable storage device, said readable storage device configured to store said first and second membership indicia in said readable storage device database.

4. The system according to claim 3, wherein said readable storage device database further includes a rewards data file for storing rewards value.

5. The system according to claim 4, further including a first supplier reader and a second supplier reader, said first and second supplier readers in communication with said enrollment system, said first and second supplier readers configured to provide an interrogation signal and configured to receive at least one of said first and second membership indicia.

6. The system according to claim 5, wherein at least one of said first and second supplier systems provides value to said rewards data file.

7. The system according to claim 6, wherein said value is provided in accordance with said user data.

8. The system according to claim 7, wherein said value is provided in response to receipt of said user data.

9. The system according to claim 3, wherein said readable storage device stores said first membership indicia prior to storing said second membership indicia.

10. The system according to claim 3, wherein said readable storage device stores said first and second membership indicia substantially simultaneously.

11. The system according to claim 3, wherein said readable storage device stores at least one of said first and second membership indicia automatically.

12. A system for membership enrollment comprising:
    an enrollment system including an enrollment system server configured to process user data in connection with a user;
    a first supplier system configured to provide a first membership indicia to said enrollment system in response to said user data provided for enrollment in a first membership program;
    a second supplier system configured to provide a second membership indicia to said enrollment system in response to said user data provided for enrollment in a second membership program, said second membership indicia different from said first membership indicia;
    a radio frequency identification (RFID) storage device including a transponder system in communication with a transponder system database configured to store said first and second membership indicia, and said user data, said transponder system for receiving an interrogation signal, providing said user data and receiving at least one of said first and second membership indicia;

an RFID reader in communication with said RFID storage device and said enrollment system server, said RFID reader configured to provide said interrogation signal, receiving said user data, and configured to provide at least one of said first and second membership indicia; and wherein said enrollment system reader notifies said user of enrollment of a third supplier system and initiates a request for additional user data from the user in response to said enrollment of said third supplier system in order to be supplied to said third supplier system.

13. The system according to claim 12, wherein said RFID reader is in communication with said enrollment system for providing said user data to said first and second supplier systems.

14. The system according to claim 12, wherein said enrollment system server is configured to provide said first and second membership indicia to said RFID storage device, said RFID storage device is configured to store said first and second membership indicia in said transponder system database.

15. The system according to claim 14, wherein said transponder system database further includes a rewards data file for storing rewards value.

16. The system according to claim 15, wherein at least one of said first and second supplier systems provides value to said rewards data file, said value being provided via at least one of said RFID reader and said transponder system, and stored in said rewards data file.

17. The system according to claim 16, wherein said value is provided in accordance with at least one of said user data and a transaction indicia.

18. The system according to claim 14, wherein said readable storage device stores said first membership indicia prior to storing said second membership indicia.

19. The system according to claim 14, wherein said readable storage device stores said first and second membership indicia substantially simultaneously.

20. The system according to claim 14, wherein said readable storage device stores at least one of said first and second membership indicia automatically.

21. A method comprising:
receiving, by a computer-based system for enrolling a user in a membership program, user specific data at a universal enrollment system;
providing, by the computer-based system, the user specific data to a plurality of service providers for enrollment in a corresponding plurality of membership programs;
receiving, by the computer-based system, unique membership numbers associated with the user from the plurality of service providers; and
transferring, by the computer-based system, the unique membership numbers to a portable handheld user storage device, the storage device including a database containing a unique storage area for each unique membership number.

22. The method according to claim 21, further comprising:
receiving at least one of the unique membership numbers from the storage device upon presentation of the storage device to a first service provider, the unique membership number identifying the user as a member of a first service provider membership program;
authenticating authenticity of at least the unique membership number and user;
providing rewards points to the storage device in accordance with at least one of the unique membership number and a transaction indicia; and
providing means for storing the rewards points for later redemption.

23. A method comprising:
receiving, by a computer-based system for enrolling a user in a membership program, user specific data at a universal enrollment system;
providing, by the computer-based system, the user specific data to a plurality of service providers for enrollment in a corresponding plurality of membership programs;
receiving, by the computer-based system, unique membership numbers associated with the user from the plurality of service providers; and
transferring, by the computer-based system, the unique membership numbers to a portable handheld radio frequency identification (RFID) storage device using the storage device including a RF transponder and a database in communication with the RF transponder, the database containing a unique storage area for each unique membership number.

24. The method according to claim 23, further comprising:
receiving at least one of the unique membership numbers from the RFID storage device upon presentation of the RFID storage device to a first service provider, the unique membership number identifying the user as a member of a first service provider membership program;
authenticating authenticity of at least the unique membership number and user;
providing rewards points via RF communications to the RFID storage device in accordance with at least one of the unique membership number and a transaction indicia; and
providing means for storing the rewards points for later redemption.

25. The method according to claim 24, wherein the transfer of at least one of said rewards points, user specific data, and unique membership number is via RF.

* * * * *